US007428314B2

(12) United States Patent
Henson

(10) Patent No.: US 7,428,314 B2
(45) Date of Patent: Sep. 23, 2008

(54) MONITORING AN ENVIRONMENT

(75) Inventor: Michael Anthony Henson, North Turramurra (AU)

(73) Assignee: Safehouse International Inc., Las Vegas, NV (US)

( * ) Notice: Subject to any disclaimer, the term of this patent is extended or adjusted under 35 U.S.C. 154(b) by 603 days.

(21) Appl. No.: 11/002,445

(22) Filed: Dec. 2, 2004

(65) Prior Publication Data

US 2005/0123172 A1 Jun. 9, 2005

(30) Foreign Application Priority Data

Dec. 3, 2003 (AU) .............................. 2003906681
Mar. 31, 2004 (GB) .............................. 0407227.8
Mar. 31, 2004 (GB) .............................. 0407273.2

(51) Int. Cl.
*G06K 9/00* (2006.01)
*H04N 5/225* (2006.01)

(52) U.S. Cl. ...................................... 382/103; 348/169

(58) Field of Classification Search ................. 382/103, 382/107; 348/169
See application file for complete search history.

(56) References Cited

U.S. PATENT DOCUMENTS 6,205,231 B1 * 3/2001 Isadore-Barreca et al. .. 382/103
6,208,379 B1 * 3/2001 Oya et al. .............. 348/211.11
6,870,945 B2 * 3/2005 Schoepflin et al. .......... 382/103
6,940,492 B2 * 9/2005 Maritzen et al. ............ 345/173
6,950,013 B2 * 9/2005 Scaman et al. .............. 340/436
7,161,615 B2 * 1/2007 Pretzer et al. ............... 348/143
7,227,893 B1 * 6/2007 Srinivasa et al. ....... 375/240.08
2002/0008758 A1 * 1/2002 Broemmelsiek et al. .... 348/143
2002/0051058 A1 * 5/2002 Ito et al. ..................... 348/152
2003/0085992 A1 * 5/2003 Arpa et al. .................... 348/47
2003/0103139 A1 6/2003 Pretzer et al.
2004/0057600 A1 * 3/2004 Niwa .......................... 382/103

FOREIGN PATENT DOCUMENTS

WO WO 03/049009 A1 6/2003

OTHER PUBLICATIONS

International Search Report dated Aug. 16, 2004 from United Kingdom Patent Office relating to Application No. GB0407273.2.
International Search Report dated Aug. 16, 2004 from United Kingdom Patent Office relating to Application No. GB0407227.8.

* cited by examiner

*Primary Examiner*—Daniel G Mariam
(74) *Attorney, Agent, or Firm*—Harness, Dickey & Pierce, P.L.C.

(57) ABSTRACT

An environment is monitored by capturing image data depicting the environment and analysing the image data to identify moving foreground objects. Upon identifying an object, the movement of said object is tracked, and graphical output data is generated providing a representation of the movement superimposed upon a representation of said environment.

16 Claims, 32 Drawing Sheets

MONITORING AN ENVIRONMENT

FIELD OF THE INVENTION

The present invention relates to monitoring an environment and analysing captured image data.

BACKGROUND OF THE INVENTION

Automated monitoring systems (possibly used for surveillance purposes) are shown in international patent publication WO 01/78397, assigned to the present applicant. A known system provides a plurality of cameras for monitoring one or more objects so as to detect predetermined characteristics and generate trigger signals. An event system receives events and determines whether an alarm condition exists.

SUMMARY OF THE INVENTION

According to an aspect of the present invention, there is provided a method of monitoring an environment, comprising the steps of capturing image data depicting said environment, and analysing said image data to identify moving foreground objects; wherein upon identifying an object, the movement of said object is tracked and graphical output data is generated providing a representation of said tracked movement superimposed on a representation of said environment.

The invention will now be described by way of example only with reference to the drawings.

WRITTEN DESCRIPTION OF THE BEST MODE FOR CARRYING OUT THE INVENTION

FIG. 1

Figure 1:
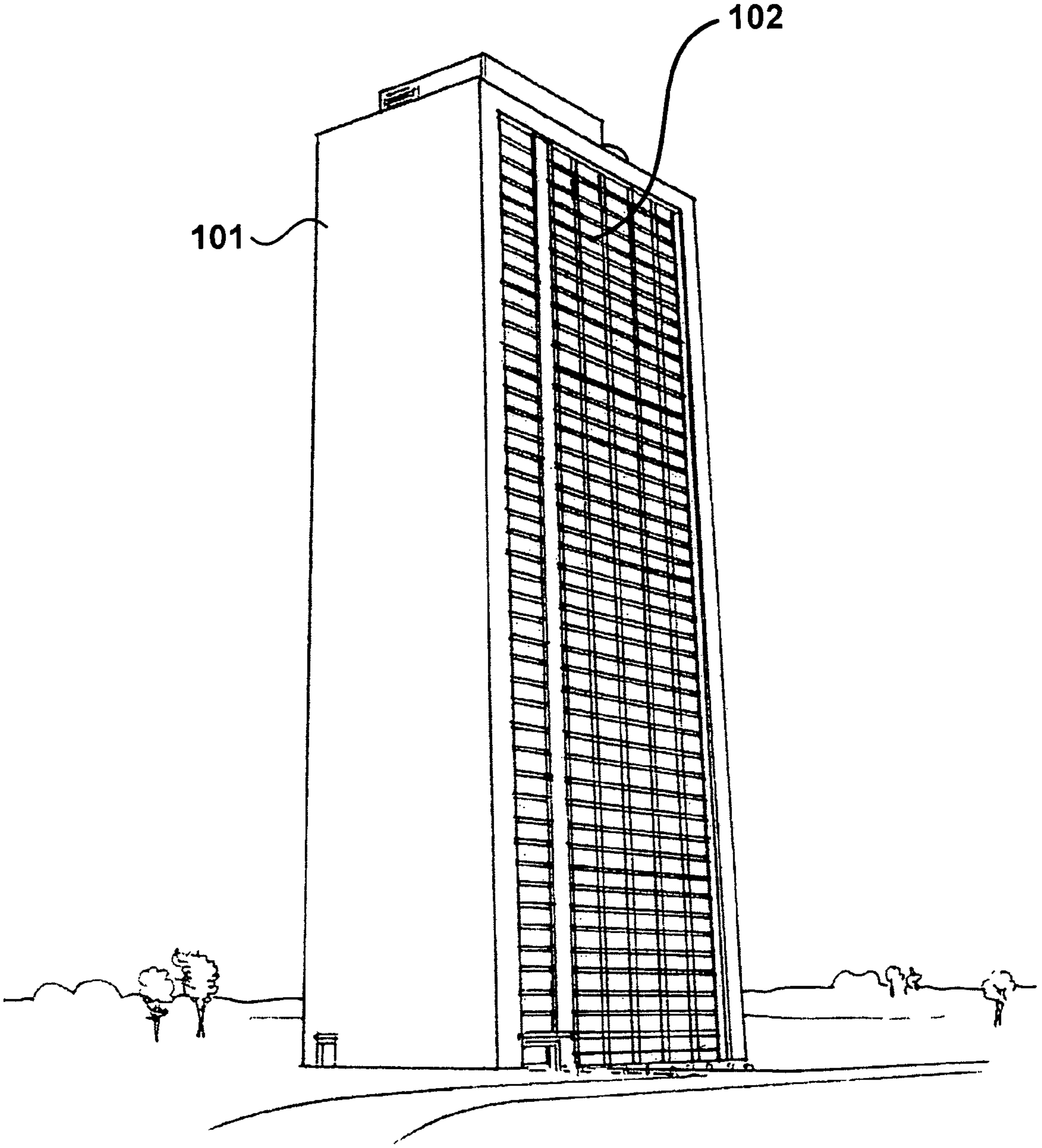
FIG. 1 shows an environment in which monitoring may be required.

In this embodiment, an environment in which monitoring may be required, but where invasion of privacy is likely to be a problem, is shown in FIG. 1. It may be desirable to monitor a location, such as apartment block 101, particularly to detect objects falling from an apartment window such as window 102. In addition, it may be useful to detect that an object has fallen, and determine where exactly it has fallen from, and therefore establish who is responsible, without invading the privacy of the occupants of the apartment block.

Monitoring equipment such as cameras can be used in this environment, but the personnel monitoring the images (or recordings of the images), which in this embodiment take the form of video footage, may be in breach of privacy regulations. In any event, occupants are likely to be unwilling to have cameras focused on their homes.

FIG. 2

Figure 2:
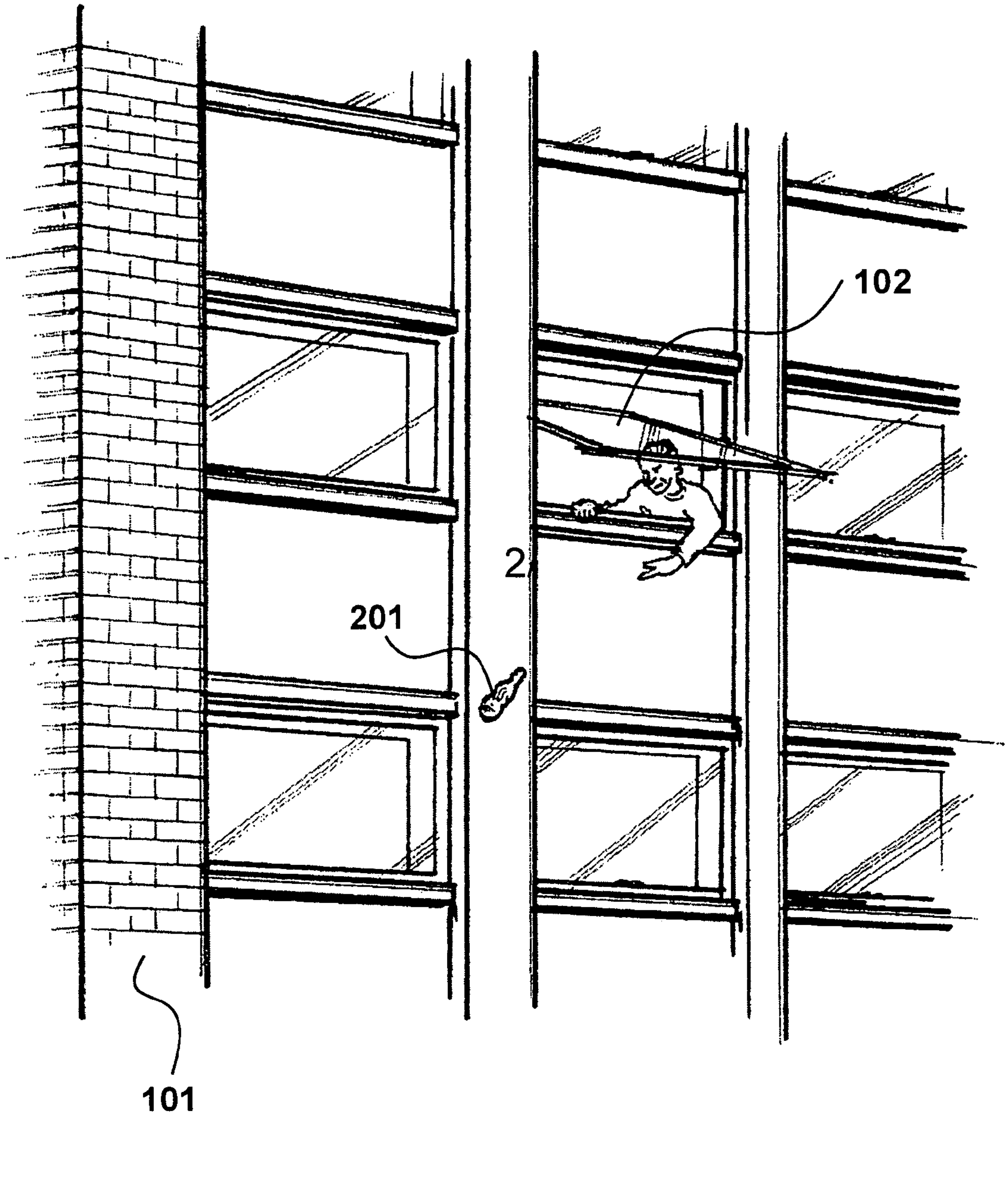
FIG. 2 shows an incident occurring in the environment shown in FIG. 1.

One problem with apartment blocks is that objects thrown from the windows can cause serious injury to people on the ground, because of the significant height from which they are dropped. In FIG. 2, milk bottle 201 is being thrown from window 102 of apartment block 101.

FIG. 3

Figure 3:
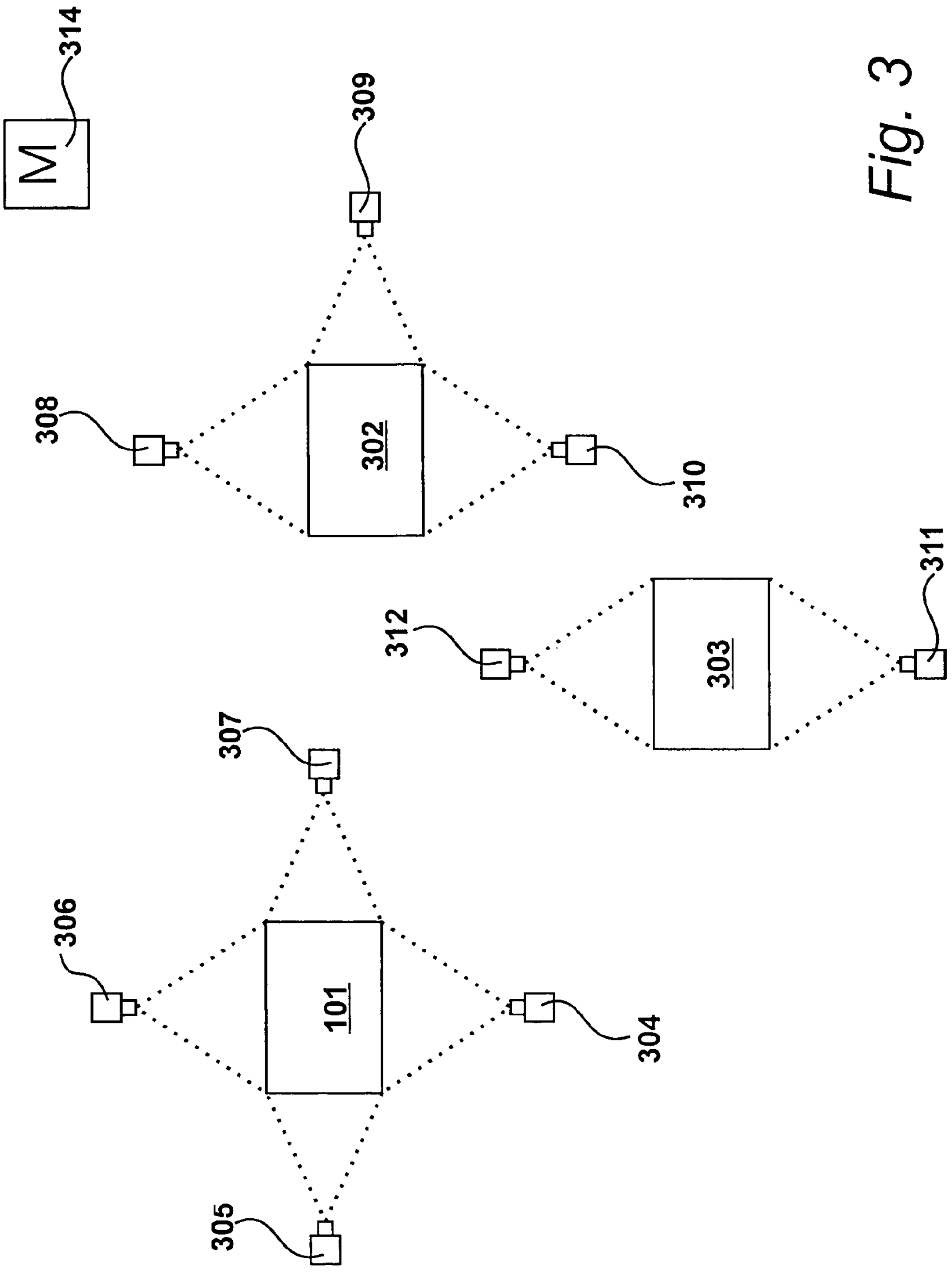
FIG. 3 shows a plan view of a residential area, that includes the environment shown in FIG. 1.

FIG. 3 shows a plan view of a residential area including apartment blocks 101, 302 and 303. Apartments 101 are monitored by cameras 304, 305, 306 and 307. Apartments 302 are monitored by cameras 308, 309 and 310. Apartments 303 are monitored by cameras 311 and 312. Cameras 304 to 307 view all four sides of apartment block 101. Three sides of apartment block 302 are monitored by cameras 308 to 310, and two sides of apartment block 303 are monitored by cameras 311 and 312. Cameras are positioned so as to cover all windows and possibly also roof areas from which objects may be thrown.

Signals from cameras 304 to 312 are supplied to a monitoring station 314. At monitoring station 314, security personnel are alerted to the presence of a falling object, or other incident, and can take steps to determine the source.

FIG. 4

Figure 4:
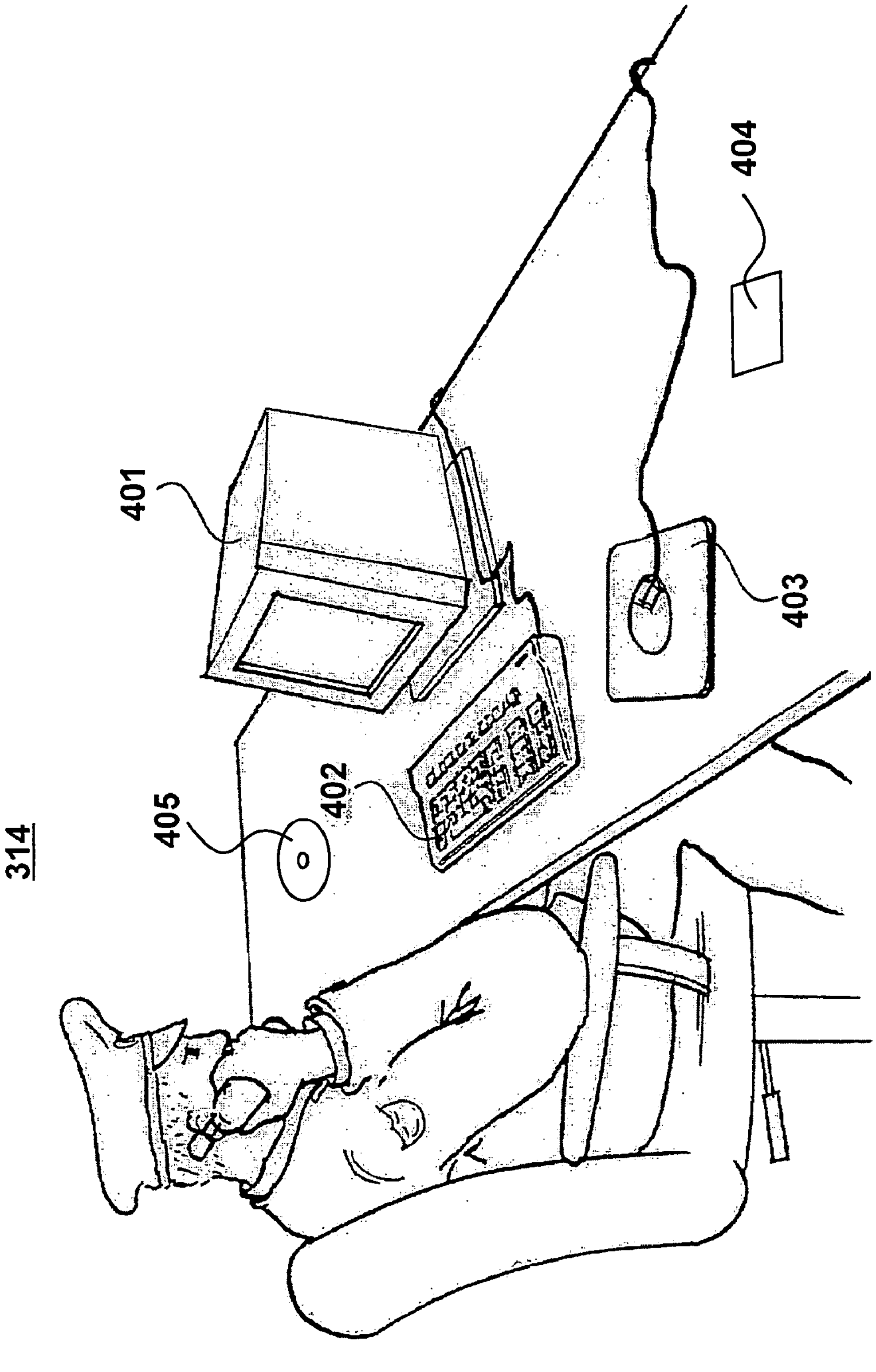
FIG. 4 details a monitoring station shown in FIG. 3.

The monitoring station 314 shown in FIG. 3 is detailed in FIG. 4. Monitor 401 can display graphical output data, in this case images, although it could be in a different form. The security officer (operator) may make observations from these images and then act upon these observations. The digital monitoring cameras shown in FIG. 3 (304 to 312) supply input to a processing environment (shown in FIG. 5) such that the visual information is monitored by said processing environment. A local processing system is also configured to receive manual input data from the operator via a keyboard 402 and a mouse 403 or similar manually operable input devices.

A security chip 404 or card with secure memory for defining the privacy level to which the security guard has access is also provided. Security chip 404 contains a digital signature to authenticate username and password entry to identify each of the personnel permitted to use the monitoring system. Authentication may also involve bio-metric means such as fingerprint or iris detection.

In this embodiment, a security guard may be a highly restricted operator with very limited privacy level access, their supervisor may be a less restricted operator, and a police officer or other person of authority may be a non-restricted operator, with access to all data and images.

A CD-ROM or DVD 405 is also provided which contains a set of instructions for the monitoring system.

Because the monitoring system performs a degree of processing on the signals received from cameras 304 to 312, the images or image related data may not be displayed in full, or at all, to the operator. This prevents invasion of privacy.

FIG. 5

Figure 5:
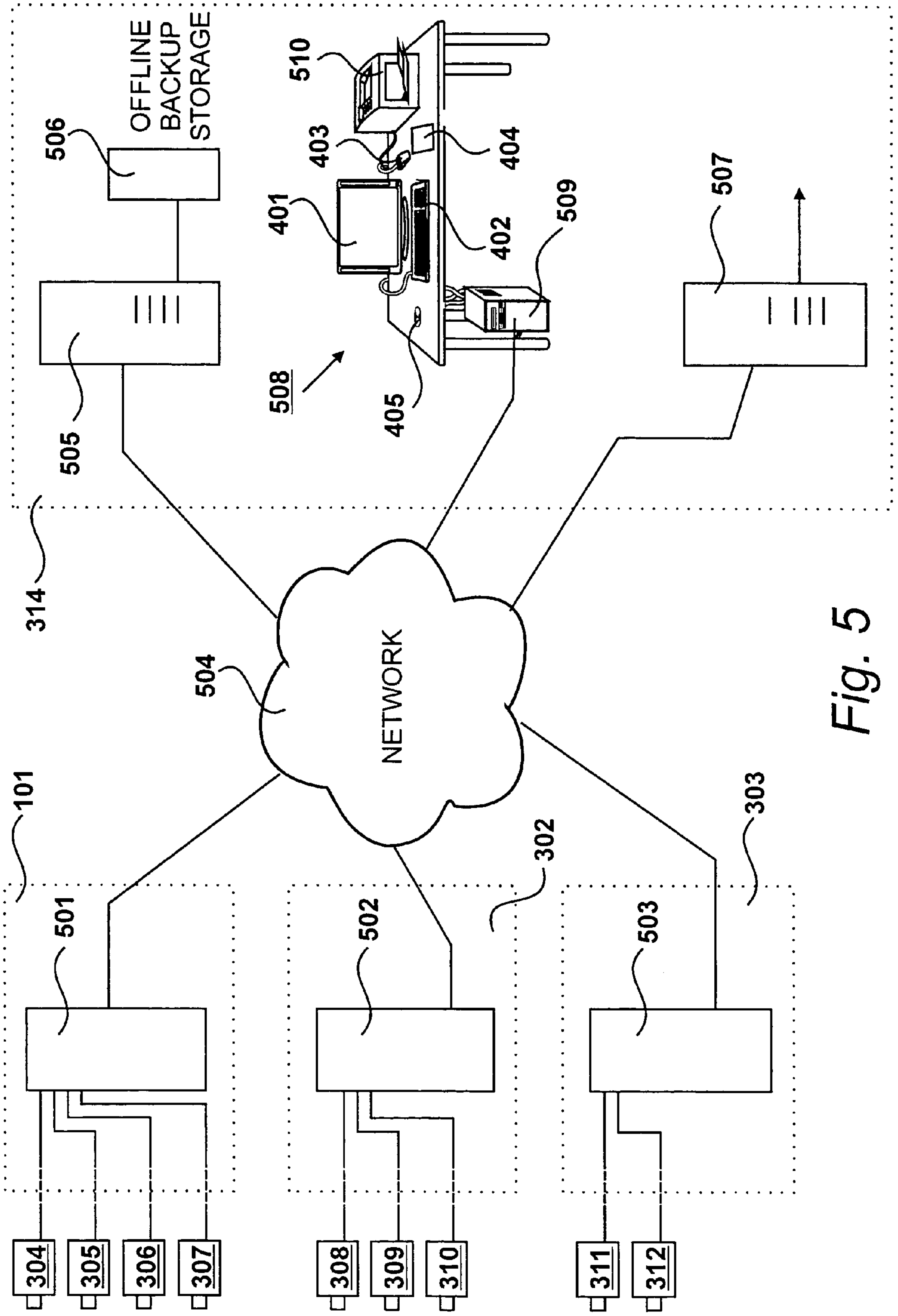
FIG. 5 shows an overview of a monitoring system.

The network of cameras illustrated in FIG. 3 in combination with the local processing environment shown in FIG. 4 form part of an overall monitoring apparatus, as illustrated in FIG. 5. Image data processing systems 501, 502 and 503 communicate via a high-speed network such as Ethernet network 504. In this embodiment, image signals are received as inputs to processing system 501 from digital monitoring cameras 304 to 307. In this embodiment, image capture and analysis is performed by the processing system 501 which is located in apartment block 101, for example in an office in the basement. Similarly, processing system 502, located in apartment bock 302, receives input image data from monitoring cameras 308 to 310. Each camera captures image data depicting the monitored environment. Processing system 503, located in apartment block 303 receives input image data from monitoring cameras 311 and 312.

At each processing system 501 to 503 image data processing is performed which results in decisions being made. It is decided whether particular input images or image data are to be stored, processed, displayed to the operator, or another action is to be taken, also depending upon the level of access assigned to the operator.

The monitoring station 314 includes a processing system 505 which includes additional offline backup storage 506. This can also allow for image data to be duplicated onto removable data media, such as digital video tape, magnetic or optical disks, or any other form of storage, where appropriate.

In the environment shown in FIG. 3, the digital monitoring cameras are interfaced to processing systems similar to processing system 501 and, similarly, these additional processing systems are also connected to the Ethernet network 504, thereby allowing all image data produced within the environment to be displayed, analysed and stored to an extent considered appropriate by the monitoring system, taking into account security level settings for any given member of staff.

Monitoring station 314 also includes remote processing system 507, which is available to provide remote analysis of incoming video data in situations where additional processing capacity is required or is considered desirable. In addition, remote processing system 507 also communicates with a plurality of output alarm generating devices which, in response to potential activities of interest being monitored, will result in appropriate alarm triggers being generated such that appropriate action may be taken.

Monitoring station 314 also includes an operator's workstation 508. As described with reference to FIG. 4, monitoring workstation 508 is shown communicating with the network 504 via a processing system 509. Images and/or graphical output data generated by processing system 509 are selectively presented to personnel on monitor 431, in accordance with privacy level settings. Operating instructions for the processing system 509 are, in this embodiment, loaded from an instruction carrying medium such as a CD-ROM 405 receivable within a CD-ROM player. Alternatively, operating instructions may be received from a server via the network 504, or from any other suitable location. These possibilities and others exist for other processing systems within the overall apparatus.

In this embodiment a network connection to operator's workstation 508 allows the workstation to view analysis results generated from captured input signals thereby allowing monitored activities, or data relating to activities, to be observed by the operator. In addition, the network connection also facilitates the replay and examination of recorded material, including images and results of analyses performed by the monitoring infrastructure. Recorded images may also be retrieved from the storage system 505/506. In some systems, a network connection may not be required as images could be retrieved by another means.

In this embodiment, the operator's workstation 508 also includes a printing device 510 configured to produce reports and results of monitoring analysis.

FIG. 6

Figure 6:
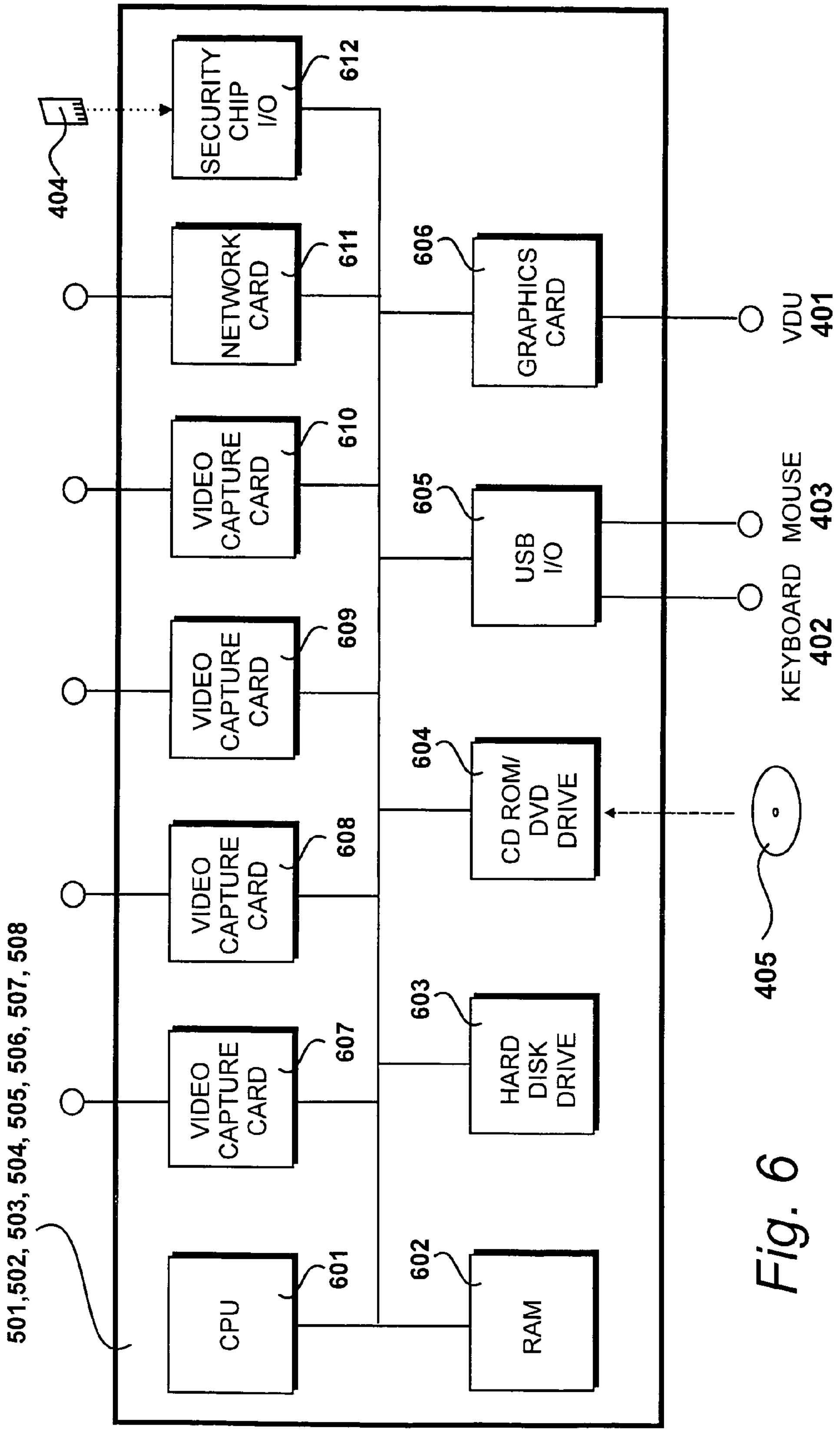
FIG. 6 illustrates processing apparatus of the type used in the monitoring system shown in FIG. 5.

The processing systems shown in FIG. 5 are all substantially similar, as illustrated in FIG. 6. In this embodiment, each of the processing systems is based substantially upon a standard PC constructed from general purpose "off the shelf" components. However it will be appreciated that many other types of processing platform may be adopted in order to optimise price/performance considerations.

A Pentium® 4 central processing unit 601 runs at a clock speed of 3 gigaHertz. Internal communication within the system occurs over a system bus 602 facilitating, for example, communication with two gigabytes of dynamic random access memory, available for storing executable instructions, and pre-processed and post-processed data.

Non-volatile storage is provided by a hard disk drive 603, for the storage of instructions and for the storage of large quantities of data. In some configurations, such as that for the data store, the hard disk drive 603 may take the form of a redundant array of independent disks (RAID) providing a total capacity in excess of one terrabyte. In other processing systems a storage capacity of 90 gigabytes is generally available.

As previously described, program instructions are received from a CD-ROM 405 via a CD-ROM/DVD drive 604. In this embodiment, instructions are installed within the local system 509, whereafter these instructions can be installed on other processing systems via the network such that, after installation, these processing systems may be configured remotely so as to perform their specialised operations.

System 509 also includes a universal serial bus (USB) input/output interface 605 for providing connectivity with the input devices 402 and 403 and with the output printing device 510. The graphics card 606 receives rendering instructions and data from the processing unit 601 so as to display an interface and camera images to the display monitor 401.

Processing systems 501 to 503 connected to digital monitoring cameras (as shown in FIG. 5) include video capture cards 608 to 610, in this case one for each of the video inputs. The video capture cards 608 to 610 receive real time digital video signals from the digital monitoring cameras to which they are connected. The cards in turn provide output data in the form of addressable image frames that can be accessed by the central processing unit to facilitate local analysis, transmission for remote analysis, real time monitoring or storage. Communication to the network 504 is facilitated by the provision of a network card 611. Finally, a security chip input output (I/O) circuit 612 provides an interface to removable security chip 404, which can implement different levels of access for different personnel, if desired.

FIG. 7

Figure 7:
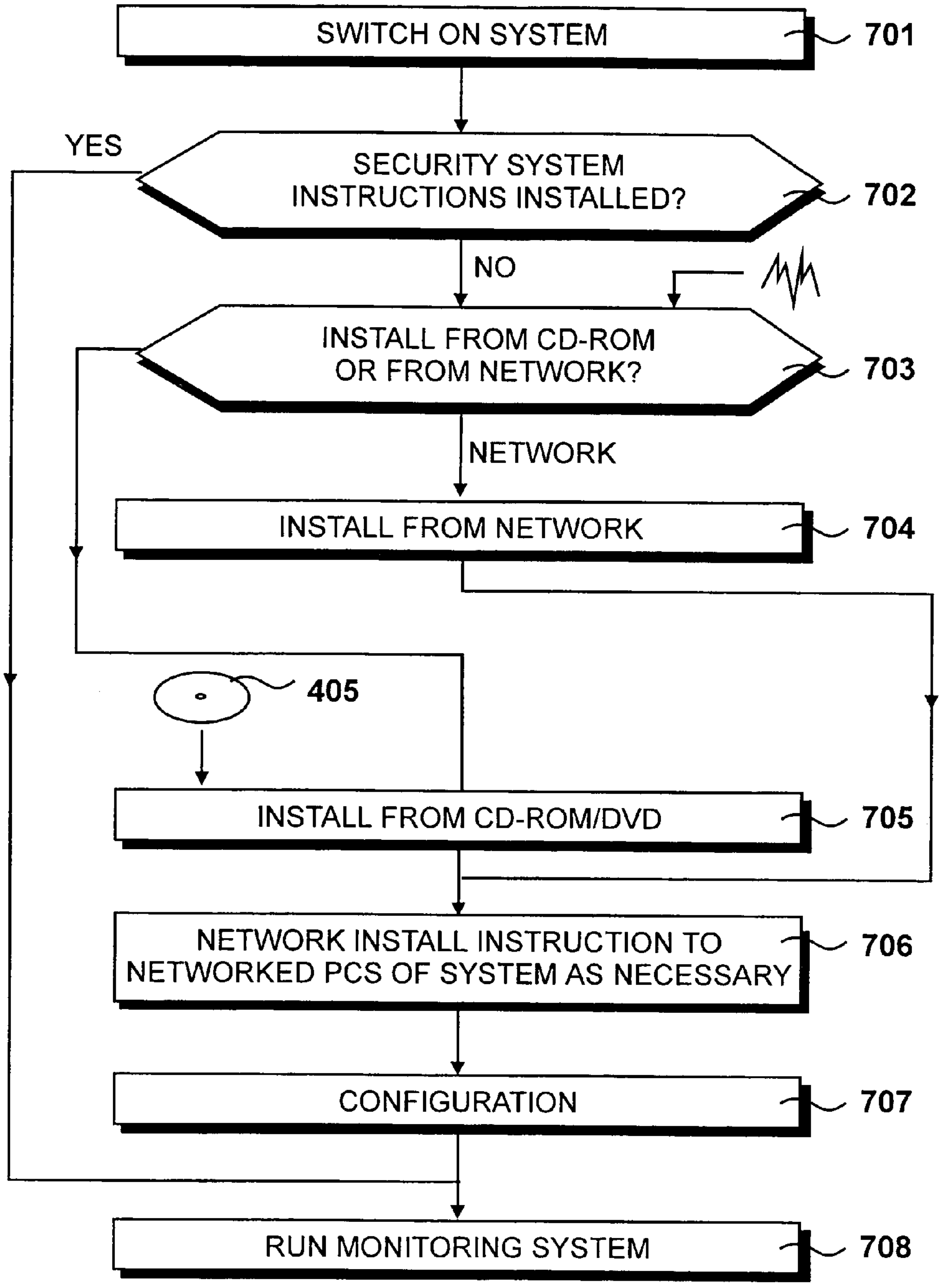
FIG. 7 shows operation of the system shown in FIG. 5.

After constructing the apparatus as shown in FIG. 5, installation, configuration and operation are performed as shown in FIG. 7. At step 701 the security system is switched on. At step 702 a question is asked as to whether monitoring systems are already installed. If so, control is directed to step 709 whereupon the monitoring system is operated. Alternatively, control is directed to step 703, where a question is asked as to whether installation should be performed from a CD-ROM/DVD disk or from a network.

If installation is to be performed via a network, control is directed to step 704, whereupon installation is performed via the network 504, possibly via a secure connection to a site on the internet. Security instructions can also be installed from the CD-ROM disk 405, as performed at step 705. Thereafter control is directed to step 706. Having installed monitoring instructions on processing system 509 shown in FIG. 6, network installation to other processing systems may be performed at step 706 via the network 504.

Similar or identical instructions may be installed to each of the processing systems, and the relevant functionality is activated in response to a configuration script running on the first processing system upon which the instructions were installed. At step 707 this configuration script is executed, resulting in configuration of the various processing modules upon the various processing systems. Thereafter, at step 708 the security system instructions are activated.

FIG. 8

Figure 8:
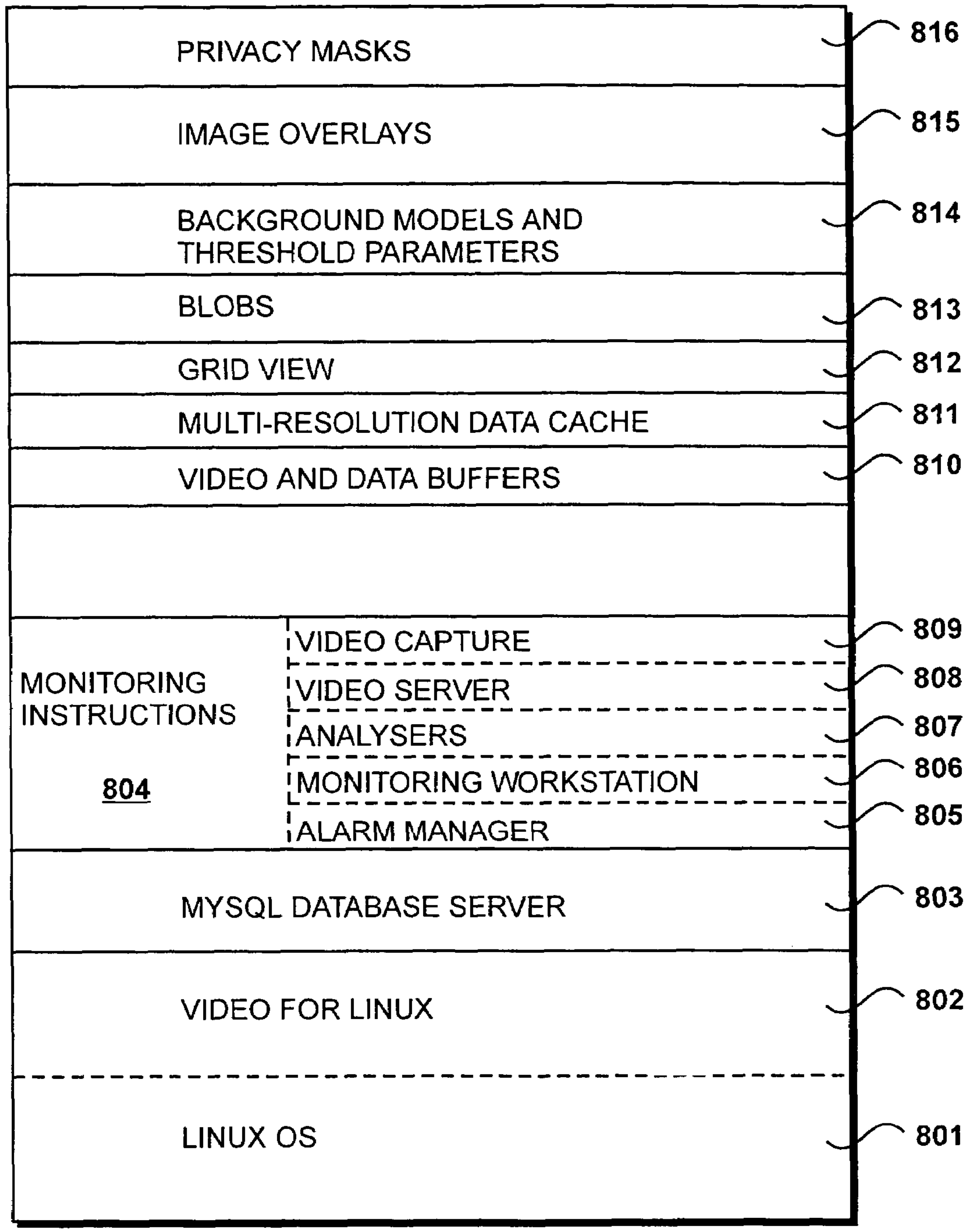
FIG. 8 shows contents of main memory of processing apparatus of the type shown in FIG. 6.

A summary of the contents of main memory 602 for each processing system illustrated in FIG. 5 (when running the monitoring system as shown at step 708) are illustrated in FIG. 8. Each of the processing systems will store slightly different contents in memory and FIG. 8 illustrates the contents that will be found at least somewhere in the monitoring system in this embodiment in order to perform the various monitoring functions.

A Linux® operating system 801 provides basic functionality for each processing platform, including video for Linux® instructions 802 to facilitate video hardware device abstraction, thereby allowing the digital monitoring cameras to communicate with the video capture cards. Of course any other suitably configured operating system with video capability could also be used.

A MySQL database server is provided at the datastore 505 to facilitate non-linear data storage and retrieval of time-based images and video analysis data. Any database server that allows for this type of storage could be used. Monitoring instructions 804 include alarm manager instructions 805, monitoring workstation instructions 806, analyser instructions 807, video server instructions 808 and video capture instructions 809.

Video and data buffers are provided in several of the processing systems for facilitating various communication protocols, analyses and viewing. In this embodiment, a multi-resolution data cache 811 and grid view data 812 are provided at the local workstation system 509. Binary large objects (blobs) 813 are used by analysis instructions 807. Background models and threshold parameters 812 are also utilised by analysis instructions 807. Image overlays 815 and privacy masks 816 are provided on the processing system 509 in this embodiment to facilitate a useful level of monitoring system operation, without invading privacy or violating privacy laws.

FIG. 9

After the system configuration performed at step 708 in FIG. 7, each of the processing systems 501, 502, 503, 505, 506, 507 and 509 is configured to execute certain subsets of the instructions 805 to 809 shown in FIG. 8. This results in the instantiation of a number of objects, or modules, at various processing nodes on the system. In order to provide an understanding of the overall operation of the security system, an illustration of how these objects interact with each other in this embodiment is provided in FIG. 9.

Cameras, such as cameras 304 to 312, are connected to video capture objects 901, 902, 903, 904, 905 and 906. In this embodiment capture objects 901 to 906 are instantiated as a result of execution of video capture instructions 809. Each video capture object executes instructions for receiving and formatting images from a particular camera, such as camera 304. In this embodiment the capture process reduces the camera frame rate from 25 or 30 frames per second to around 10 frames per second, although frame rates can be modified as required. Capture objects 901 to 906 also facilitate dynamic configuration of camera parameters.

Analyser objects 907, 908, 909, 910, 911 and 912 receive video frames from respective video capture objects 901 to 906. In this embodiment analyser objects 907 to 912 are instantiated as a result of analyser instructions 807.

Capture object 901, which is connected to camera 304, supplies images to a first analyser 907. Capture objects 901 and analyser 907 are (in this embodiment) both located on the same processing system 501. However it is also possible for these objects to be located on different processing systems as illustrated by capture object 905 and analyser 911 which communicate via the network 504. In this case a video server 913 is provided to enable the network to be used transparently. Video server objects 913 and 914 are instantiated as a result of executing video server instructions 808. This arrangement provides a high degree of system flexibility, and facilitates straightforward upgrading of hardware as well as making optimal use of resources available.

The analysers 907 to 912 generate image and data outputs that may be monitored in real time by an alarm manager object 915 and/or an operator's workstation object 916. These objects are instantiated as a result of initially executing instructions 805 and 806 respectively. Output from the analysers 907 to 912 is generally supplied to a data store object 917. The data store 917 also facilitates playback of recorded images and data by the operator's workstation object 916. The data store object 917 is created as a result of executing the MySQL database server instructions 803.

The analyser 907 performs sophisticated analysis of the images received from camera 304. Depending on the contents of these images the analyser 907 may supply image data and parameters to the data store object 917, and/or to the operators workstation object 916, and/or to the alarm manager object 915.

FIG. 10

Figure 9:
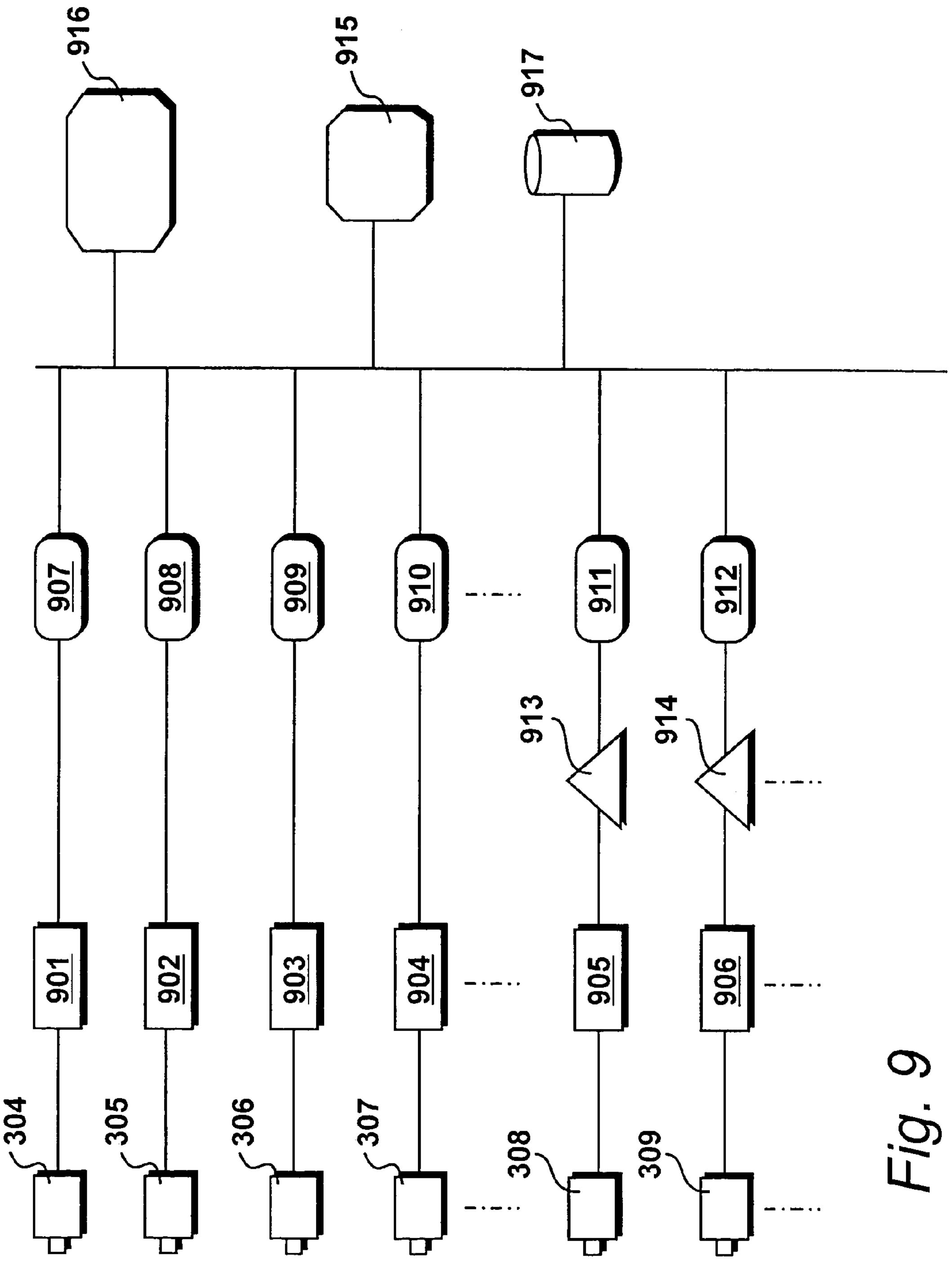
FIG. 9 shows an overview of interacting system objects.
Figure 10:
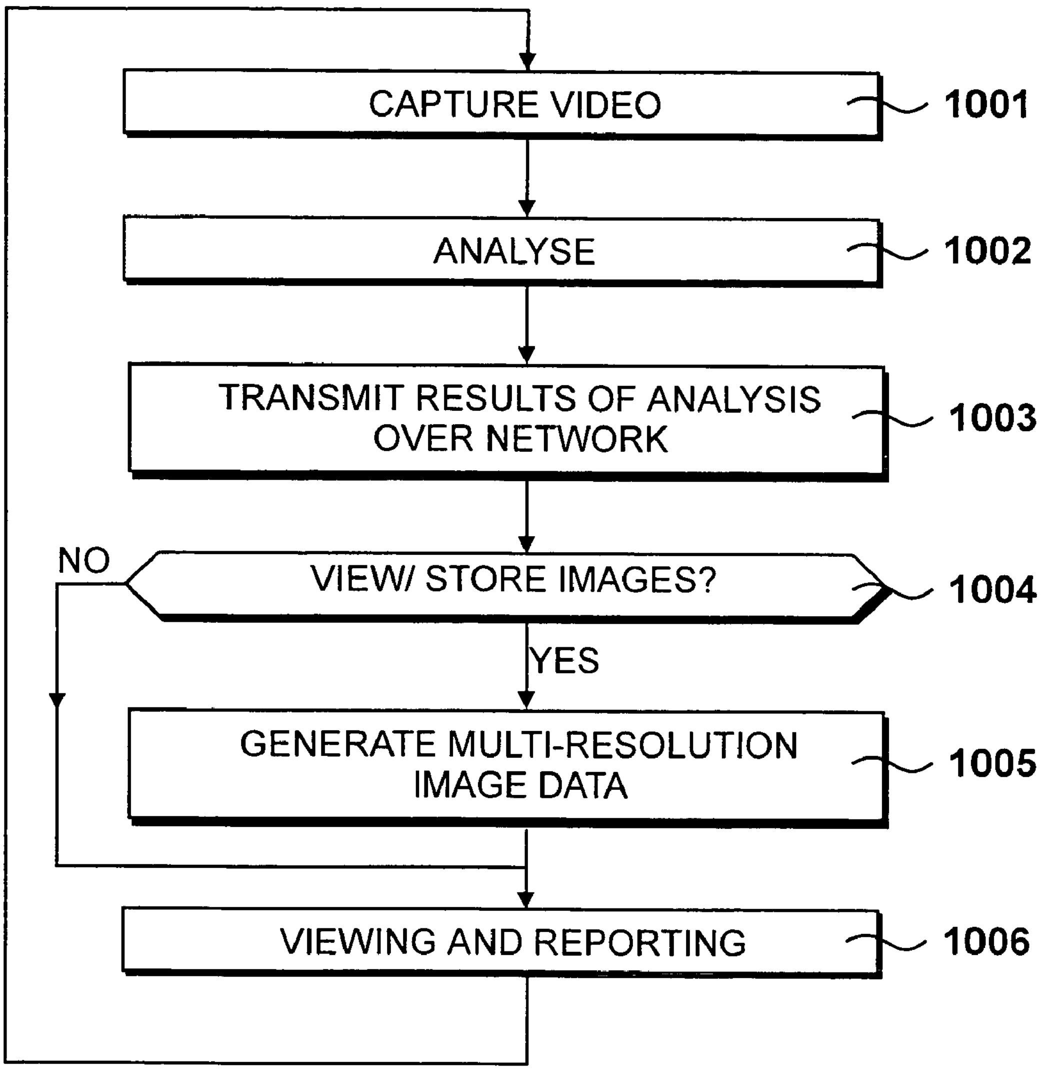
FIG. 10 illustrates operations performed by the system shown in FIG. 9.

A summary of the operations of the system shown in FIG. 9 is provided in FIG. 10. At step 1001 video capture is performed, wherein digitised frames are received from cameras, usually at a high rate of around 25 frames per second. This is sub sampled down to 10 frames per second for security purposes and to reduce unnecessary processing by the analysers 907 to 912.

At step 1002 sophisticated analysis of incoming video takes place in order to identify events of potential interest. Furthermore, at step 1003 the results of analysis at step 1002 are transmitted over the network. Depending upon the nature of the information produced by the analysis, the results may be transmitted to different parts of the system. For example, object-tracking information may be stored on the data store 505, or, depending upon how privacy access levels are configured, may be transmitted directly to the workstation 508 for display to an operator.

At step 1004 a question is asked as to whether the viewing or storing of images is required. Depending upon configuration of the system, and privacy regulations, it may be the case that images are not stored on the data store or transmitted for viewing to the workstation but that monitoring is performed entirely based on the results of image analysis rather than the images themselves. An example of this would be viewing tracking information relating to the movement of foreground objects superimposed over a diagram of the area the camera can view. This is known as an overlay, and is further described with reference to FIG. 28.

Alternatively, images may be viewable and/or stored, but may only be seen as a result of verification of permission to do so. In this embodiment, image viewing is not permitted until it can be confirmed that an offence has taken place, and only then by a non-restricted operator who has a high level of privacy access. For example, tracking information could provide evidence of an offence, which could allow personnel with appropriate privacy level access on their security chip 404 to view the images stored.

In any event, all access to data (live or recorded) is logged to enforce residents privacy. This means that any viewings of the data are recorded and can be examined later, these logs cannot be erased or modified by the operator.

If viewing or storage of the images is not required, control is directed to step 1006. If the question asked at step 1004 is answered in the affirmative, and therefore the viewing and/or storage of images is required, then multi-resolution image data is generated at step 1005, as further detailed in FIG. 18. The image data is generated according to analysis performed at step 1002, and is forwarded to a recipient object or objects, possibly including workstation object 916 and data store object 917.

At step 1006, viewing data and possibly images, and generating reports as a result of analysis takes place on operator's workstation 508. These reports may also be printed out.

The structure of FIG. 10 shows the processes being executed serially although it should be appreciated that in practice these processes are interdependent and interact in complex ways. Furthermore, it should be appreciated that pipelining techniques may in invoked in order to achieve a high level of processing efficiency and the serial representation is presented as a means of gaining an appreciation of the available functionality.

FIG. 11

Figure 11:
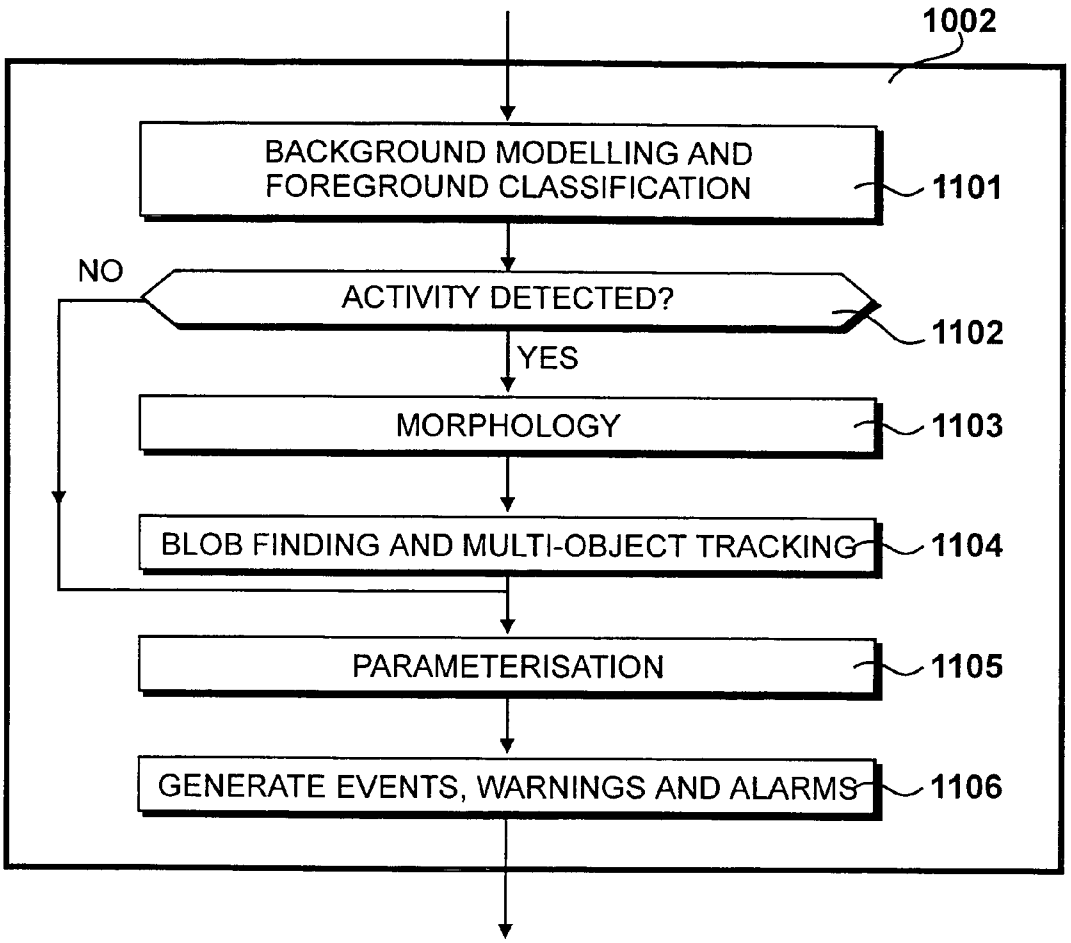
FIG. 11 shows procedures performed by an analysing object of the type shown in FIG. 9.

Procedures implemented by the analysing objects, such as object 907 are detailed in FIG. 11. The analysis step 1002 identified in FIG. 10 is performed by several analysers operating in parallel.

At step 1101 background modelling and foreground classification is performed. Image frames arriving at 10 frames per second have their individual pixels classified as being foreground or background. Reference to background is not identical to its use in, say, a compositing environment. Pixels identified as being in the "background" are derived from areas of the image where the received pixels are substantially equivalent to expected values. Thus, they are considered to represent portions of the image that have not changed, usually in the background but possibly representing a stationary object close to the camera. As used herein, foreground refers to areas of the image in which pixels have unexpected values, often caused by the movement of a person for example. Furthermore, an activity level is derived by measuring the proportion of pixels that have been classified as belonging to the foreground.

At step 1102 a question is asked as to whether activity has been detected. That is to say, has the measured level of activity exceeded a predetermined threshold. If the activity has not exceeded this threshold control is directed to step 1105, primarily to avoid making unnecessary use of the available processing facility.

If activity is detected at step 1102, morphology is performed at step 1103 so as to remove noise from the image and thereby facilitating a pixel classification process.

At step 1104 procedures are implemented in order to identify binary large objects (blobs) and multi-object tracking. Blobs are identified in each new frame and the movement of blobs from frame to frame is tracked which is often considered to be representing information likely to be of interest.

At step 1105 a parameterisation process is performed in order to calculate various parameters that result from the main analyser processing, possibly to provide feedback to the camera or to make other adjustments to the analysing processors themselves.

At step 1106 event data is generated including the creation of warnings and alarms. Each analyser 907 to 912 makes an assessment as to whether what it sees represents significant activity and possibly an event that is likely to be of interest.

FIG. 12

Figure 12:
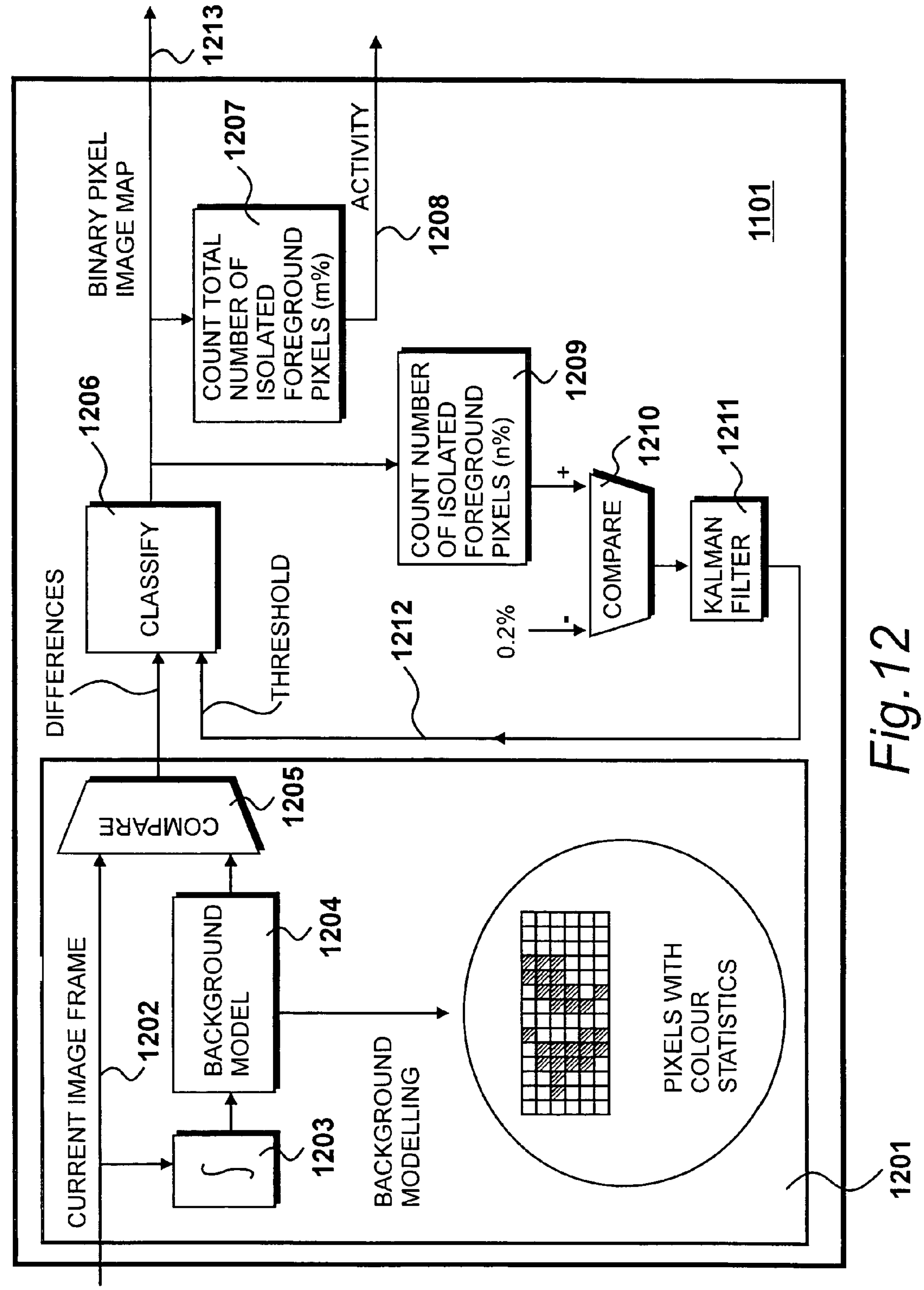
FIG. 12 details procedures for background modelling and foreground classification shown in FIG. 11.

Procedures performed at step 1101 for background modelling and foreground classification are illustrated schematically in FIG. 12. In background modelling process 1201 a current image frame 1202 has supplied the frame to an integrating process 1203. The integrating process combines the current image frame with data from a large number of previous frames and updates a background model 1204. The background model 1604 includes a set of colour statistics for each pixel in the frame, thus "background modelling" is also known as "background maintenance" and several sophisticated techniques have been developed to represent complex moving images, such as leaves and branches of a tree, as part of a background model.

A comparison process 1205 compares the background model 1204 with the current image frame 1202 and generates a difference value for each pixel. The difference value for a pixel is in the range of 0 to 1 and if the difference is large there is a higher probability that the pixel should be classified as belonging to the foreground, as previously described. Thus, a signal in the range of 0 to 1 must be compared against a threshold value to determine whether (when the level exceeds this threshold) the pixel value should be classified as foreground or background. This threshold value can be adjusted in response to various phenomena including systemic noise and global lighting variation.

Thus, it is known that providing a fixed threshold value produces results that are far from optimum. However, effecting procedures to adjust the threshold value automatically requires complex techniques. Thus, such known methods as histogram co-ordinate cornering and median statistics etc require an expensive processing overhead while producing results that tend to fall below theoretical optimums.

A classifier 1606 performs classification to determine whether a pixel belongs to the foreground or to the background. The output of the classifier 1206 is a binary pixel image map where each pixel has a value of either 1 or 0 depending upon whether it is considered to be considered to be foreground or background respectively. Foreground pixels contain activity and the level of activity in an image is quantified by an activity measuring process 1207. The total number of foreground pixels is counted and this is expressed as a proportion of the total number of pixels in the image. This value 1208 is supplied to several subsequent stages of analyser processing and is also used in the monitoring workstation.

The output of the classifier 1206 is also used as an input to the noise measuring process 1209 in which the number of isolated foreground pixels is counted and then expressed as a percentage of the total number of background pixels. As previously stated, an isolated foreground pixel will tend to have been produced due to noise present within the camera circuitry, typically from the image array, the analogue preprocessing circuit or the analogue to digital converter.

The noise comparison process 1210 compares the proportion of isolated foreground pixels with a target value of around 0.2%. If the proportion of isolated foreground pixels (due to noise) is below this target, the comparison process generates a negative output, thus lowering the threshold supplied to the classification process 1206. This results in a probable increase in the number of isolated foreground pixels when the next image frame is processed. If, alternatively, the proportion of isolated foreground pixels is higher than the configured target (around 0.2%), the threshold is increased, thereby reducing the number of isolated foreground pixels that are found in the next frame.

A filter 1211 provides strong low-pass filtering of the threshold value when the output of the comparison process fluctuates wildly. Preferably, the filter characteristic changes over time (it has a temporal characteristic) and a Kalman type filter may be adopted. Once the process converges to a stable value, the filter registers an increase in confidence in its input and reduces the level of filtering appropriately. The output of the filter 1211 is used as the input to the classifier 1206. Thus, the threshold value supplied to the classifier 1206 is derived via a degree of adaptive filtering. This results in an improved foreground/background classification frame 1213 which is in turn supplied as an input to the subsequent analysis processing.

FIG. 13

Figure 13:
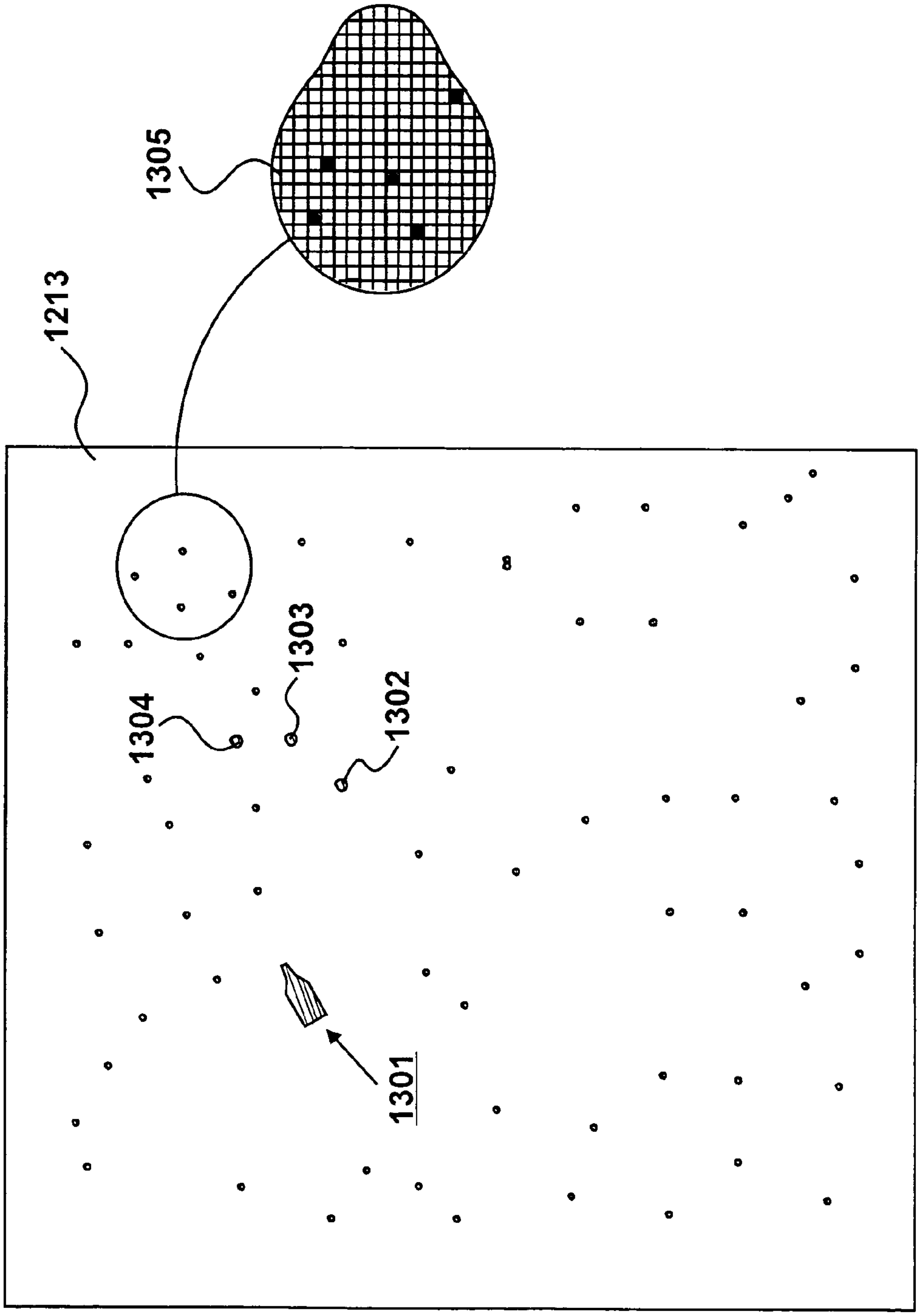
FIG. 13 illustrates the effects of a well-adjusted threshold, referenced in FIG. 12.

An illustration of the effects of the well-adjusted threshold (as described with reference to FIG. 12) is illustrated in FIG. 13. In this example, a main foreground region 1301 provides a good representation of the moving object (the bottle 201 falling from a window) viewed by camera 304. Although some incorrectly classified regions exist, such as regions 1302, 1303 and 1304, these are very small in size and can therefore be dealt with by subsequent processing measures as described with respect to FIG. 14. A highlight 1305 on the background illustrates the relatively small proportion of isolated foreground pixels.

FIG. 14

Figure 14:
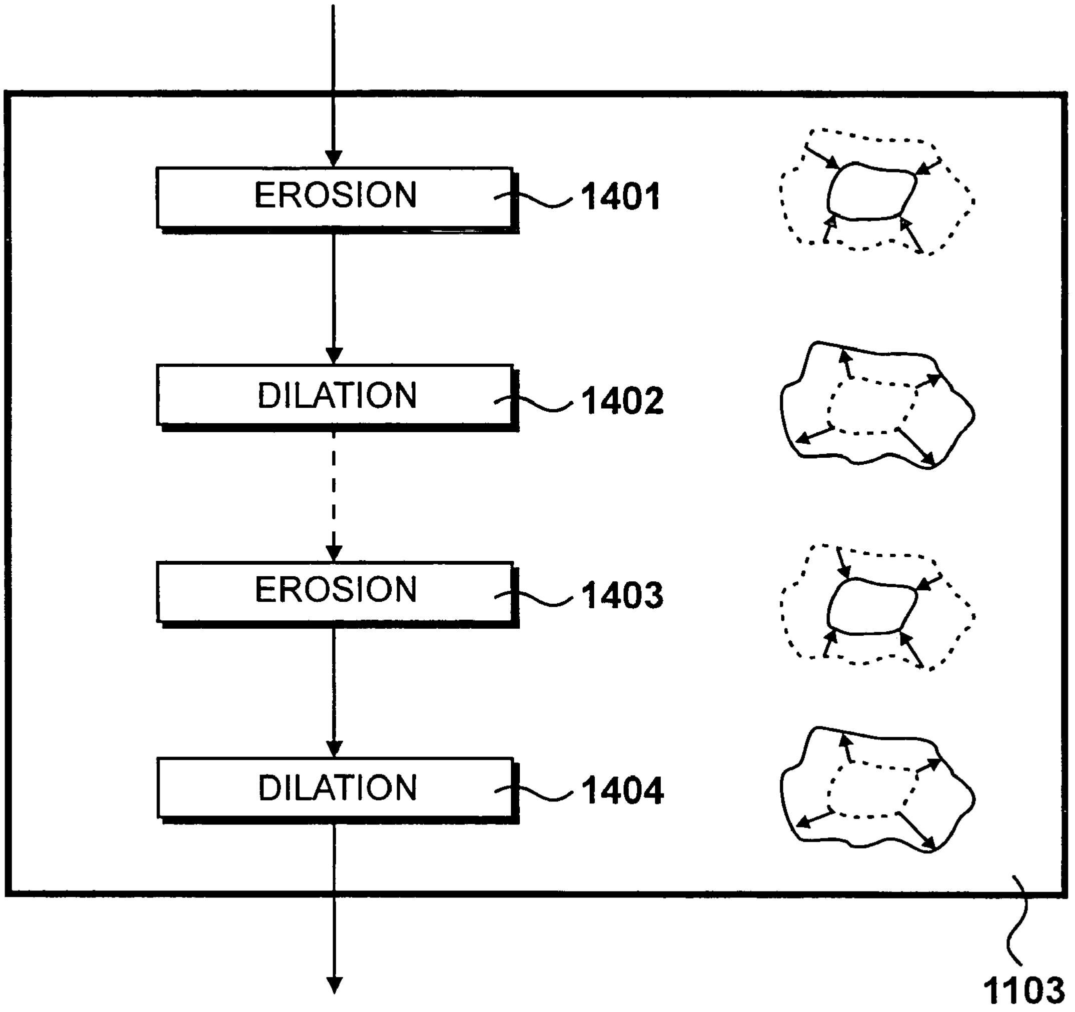
FIG. 14 shows morphology processes, as identified in FIG. 11.

Morphology processes identified at 1103 are detailed in FIG. 14. Morphology is carried out in order to remove noise from the binary pixel image map 1213.

Morphology identifies groups of adjacent foreground pixels and performs operations upon them. The two most important performed upon the foreground pixels are those of erosion and dilation. These steps are performed repeatedly to remove noise from an image. During erosion, step 1401, the outline of a group of foreground pixels is shrunken by a selected number of pixels, for example 5. This is followed by process 1402 of dilation. During the dilation process, this process is reversed. Thus, pixels are added to the outer boundary of the foreground object. The effects of repeating these processes of erosion and dilation is to erode and then restore large group of foreground pixels but to shrink small groups of foreground pixels down to nothing such that on the next stage there is nothing to be restored by the dilation process. Thus, erosion and dilation continue at steps 1403 and 1404 for a pre-determined number of cycles In addition to removing isolated noise pixels, the processes of erosion and dilation will also have the effect of smoothing the outline of the foreground shape. Thus, isolated foreground pixels 1305 and the small foreground regions 1302, 1303 and 1304 shown in FIG. 4 are removed, by morphology processing as illustrated in FIG. 15.

FIG. 15

Figure 15:
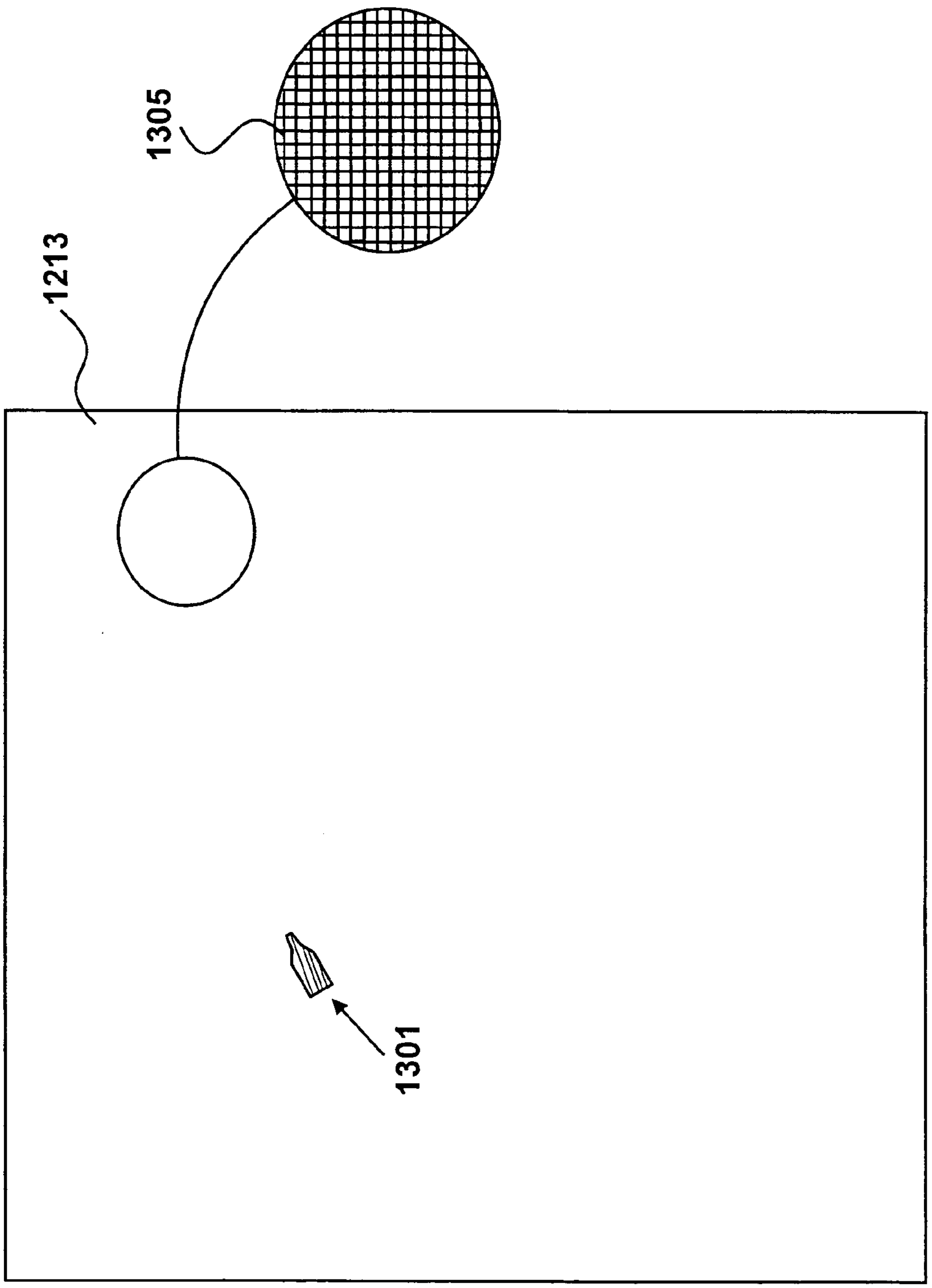
FIG. 15 shows the results of performing a background modelling process.

As stated above, FIG. 15 shows the results of performing the background modelling process to distinguish foreground pixels from background pixels, classifying the foreground pixels so as to produce a binary pixel image map and then performing morphology in order to remove noise components from the binary pixel image map.

FIG. 16

As described with reference to FIG. 11, step 1104 consists of finding and identifying binary large objects (blobs) and then performing operations to track the position of these objects on a frame by frame basis. This is illustrated in FIG. 16.

Clearly defined groups of foreground pixels are stored as binary large objects in memory region 813 of FIG. 8. An object of this type includes definitions of its centroid, defined by Cartesian co-ordinates and other dimensions that characterise or summarise the object in a way that is useful in subsequent processing operations. Thus, as the object appears in a sequence of frames its centroid is identified for each frame, specified as a unique Cartesian position within the frame. Consequently, by identifying the centroid of the object on a frame by frame basis it is possible to identify a track for that centroid position over a sequence of frames.

Subsequent processing of these tracks may make assumptions such that, for example, small incremental movements are very likely to be generated by movement of a single object rather than the sudden appearance of a completely different object of a similar size and location. Thus, conditions of this type allow it to be possible to track several binary large objects in the same image, as illustrated in FIG. 16.

Figure 16:
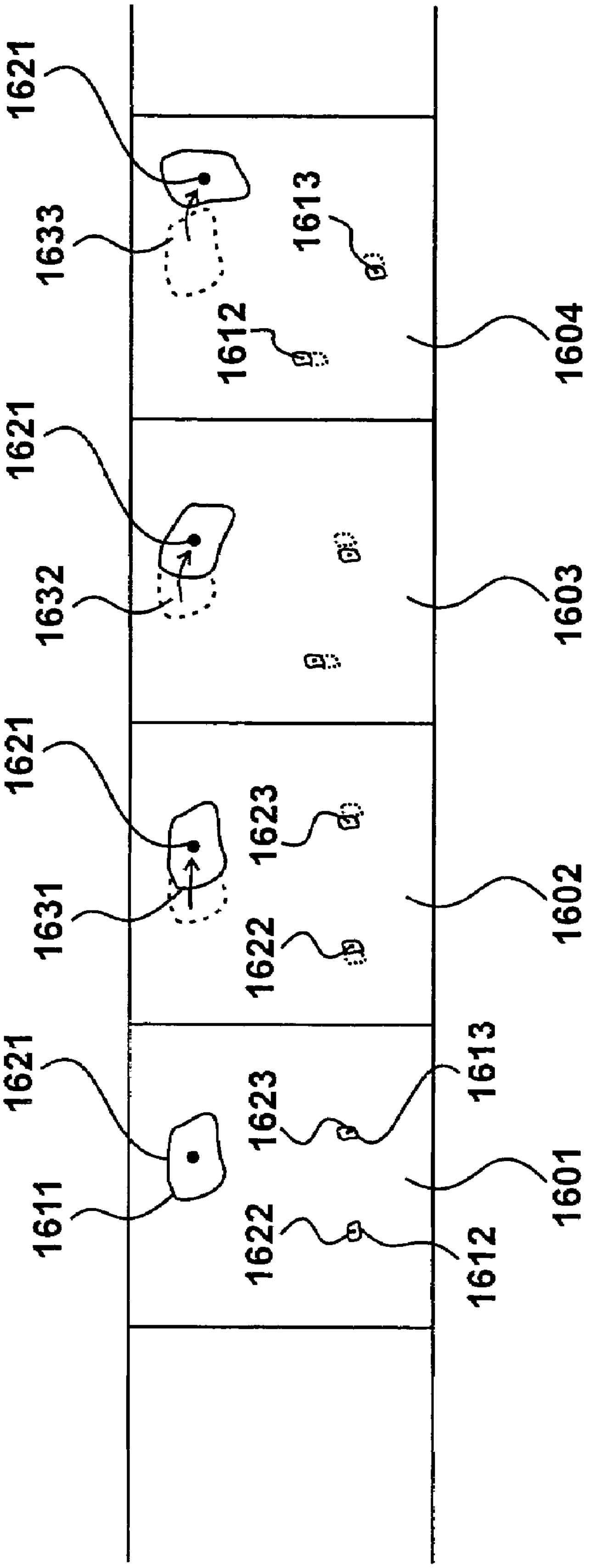
FIG. 16 shows the tracking of objects, as referenced in FIG. 11.

Frames 1601, 1602, 1603 and 1604 of a contiguous sequence are illustrated in FIG. 16. A first binary large object 1611 has been identified, along with the second object 1612 and the third object 1613. A centroid 1621 has been determined for object 1611, similarly, a centroid 1622 has been identified for object 1612 and a centroid 1623 has been identified for object 1613.

On processing frame 1602 the position of centroid 1621 is again determined. This position is then compared with the position of the centroid 1621 in frame 1601 showing that a movement has occurred as represented by arrow 1631. Similarly, it can be seen that centroid 1622 has also moved and the movement has also occurred with respect to centroid 1623.

Further movement of centroid 1621 is identified in frame 1603 such that the totality of the movement is now represented by arrow 1632. Again, in frame 1604 centroid 1621 has moved further (to the right) and again the overall movement from its position shown in frame 1601 is represented by arrow 1633. Movements have also occurred to object 1612 and object 1613, as shown in frame 1604

In many situations, the binary large objects identified may be generated by the presence of people within a viewed scene. Thus, by tracking objects in this way, it is possible to track the position of a plurality of people as they move through an environment. This is particularly useful for counting the number of people entering and leaving a room and from these totals it is possible to derive a figure for the number of people in a room at any particular time. Thus, by ensuring that all doors etc are within the field of view of at least one digital monitoring camera it is possible to count the number of people that have entered the environment and then subsequently left the environment. To facilitate the process of identifying the movement of people into and out of an environment, the monitoring system can be configured with guard regions in images where a doorway exists. Consequently, any binary large object identified that may be considered as being person-sized moving across this guard region results in that person being counted. Furthermore, the direction of movement across the guard region may also provide information as to whether the person is moving into the environment or out of the environment.

The tracking of binary large objects may also be used to determine a number of parameters that identify unusual behaviour. One such type of unusual behaviour is referred to as "upstreaming" which may be expressed as walking the wrong way down a gangway where flow is expected to occur in a certain direction. Fast movements such as running may also be unusual in many environments and again this may be identified by calculating the velocity of the tracked centroid as it moves on a frame by frame basis. As previously described, embodiments of the monitoring system can also include sophisticated techniques for background modelling. If an object identified as foreground starts to become less noticeable (effectively blending in to the background) rather than moving across the image, an assertion may be made to the effect that the person has remained stationary for unusual periods of time and again this may give rise to an alarm condition.

FIG. 17

Figure 17:
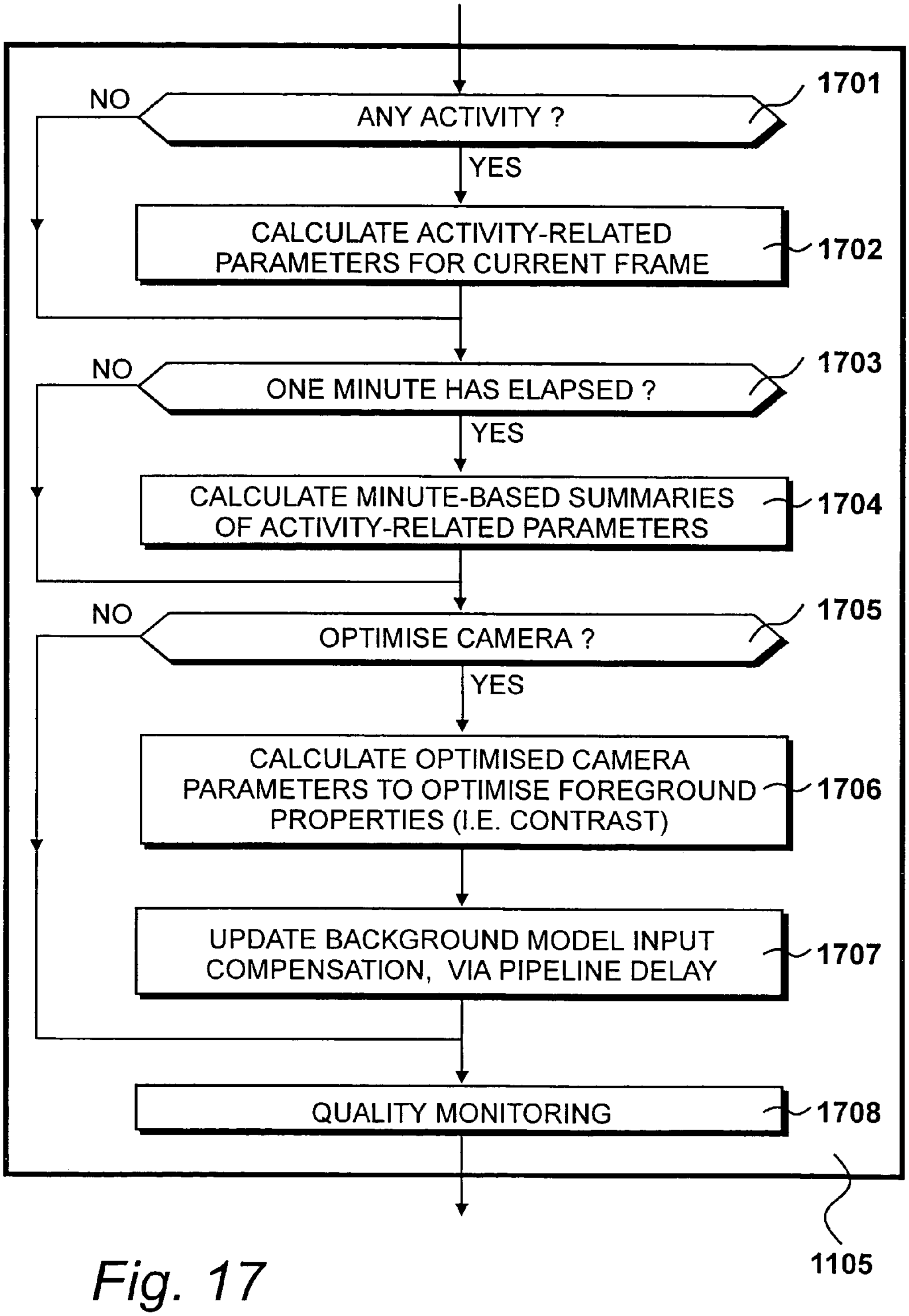
FIG. 17 details a process for the automatic generation of parameters identified in FIG. 11.

Process 1106 for the automatic generation of parameters is detailed in FIG. 17. Parameters relating to aspects of identified activity are generated when activity is detected. Consequently, a question is asked at step 1701 as to whether there is any activity and if this question is answered in the affirmative activity related parameters for the current frame are calculated at step 1702. If the question asked at step 1701 is answered in the negative, step 1702 is bypassed.

After one minute of time has elapsed the question asked at 1703 is answered in the affirmative resulting in minute-based summaries being calculated of activity related parameters at step 1704. Thus, step 1704 results in one-minute summaries being generated for each of the parameters considered at step 1702.

At step 1705 a question is asked as to whether camera optimisation is required. If answered in the affirmative, ideal camera parameters are calculated at step 1706 to optimise foreground properties. Thereafter, step 1707 the background model input compensation data is updated via the pipeline delay. Step 1707 allows the background modelling process to be compensated if changes continue to be made to the contrast and brightness at the camera. Based upon the modifications required at the camera, it is possible to perform a division followed by a subtraction on all pixel values before they enter the background modelling process. It is then possible for the foreground/background classification to continue working as normal with the image data in the areas of interest being enhanced. Given that pipeline delays exist it is necessary to equalise these delays so as to ensure that only frames affected by the new camera brightness and/or contrast settings get compensated on their way to contribute towards the background model.

After step 1707, following response to the question at step 1705 being answered in the negative, quality monitoring is performed at step 1708. In particular, information obtained as a result of analyser processing is used to identify the quality of performance of the individual digital monitoring cameras.

FIG. 18

Figure 18:
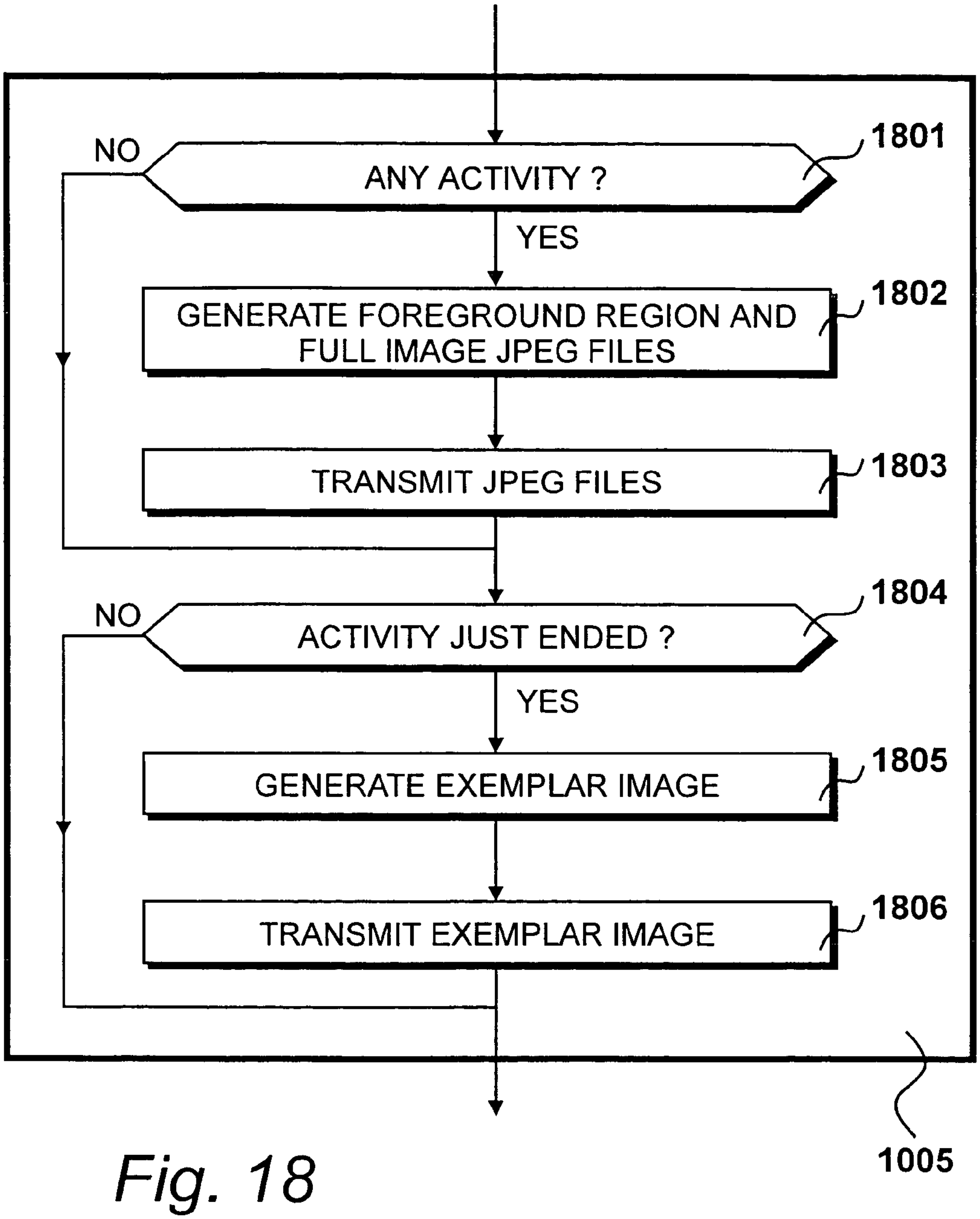
FIG. 18 illustrates operation of an analyser of the type shown in FIG. 9.

If the question asked at step 1004 (in FIG. 10) is answered in the affirmative, image data is generated by an analyser object (for example 907). The steps taken are shown in FIG. 18.

At step 1801, a question is asked as to whether any activity has been recorded. If this question is answered in the negative, control passes to step 1804. If the question is answered in the affirmative, JPEG files are generated for foreground and background at step 1802. This is detailed in FIG. 20.

At step 1803, the JPEG files generated at step 1802 are transmitted, for example to data store 505 or to workstation 508.

At step 1804 a question is asked as to whether activity has just ended. If this question is answered in the affirmative, an exemplar image is generated at step 1805, as is further detailed in FIG. 20. At step 1806 the exemplar image is transmitted, for example to data store 505 and/or to workstation 508.

FIG. 19

Figure 19:
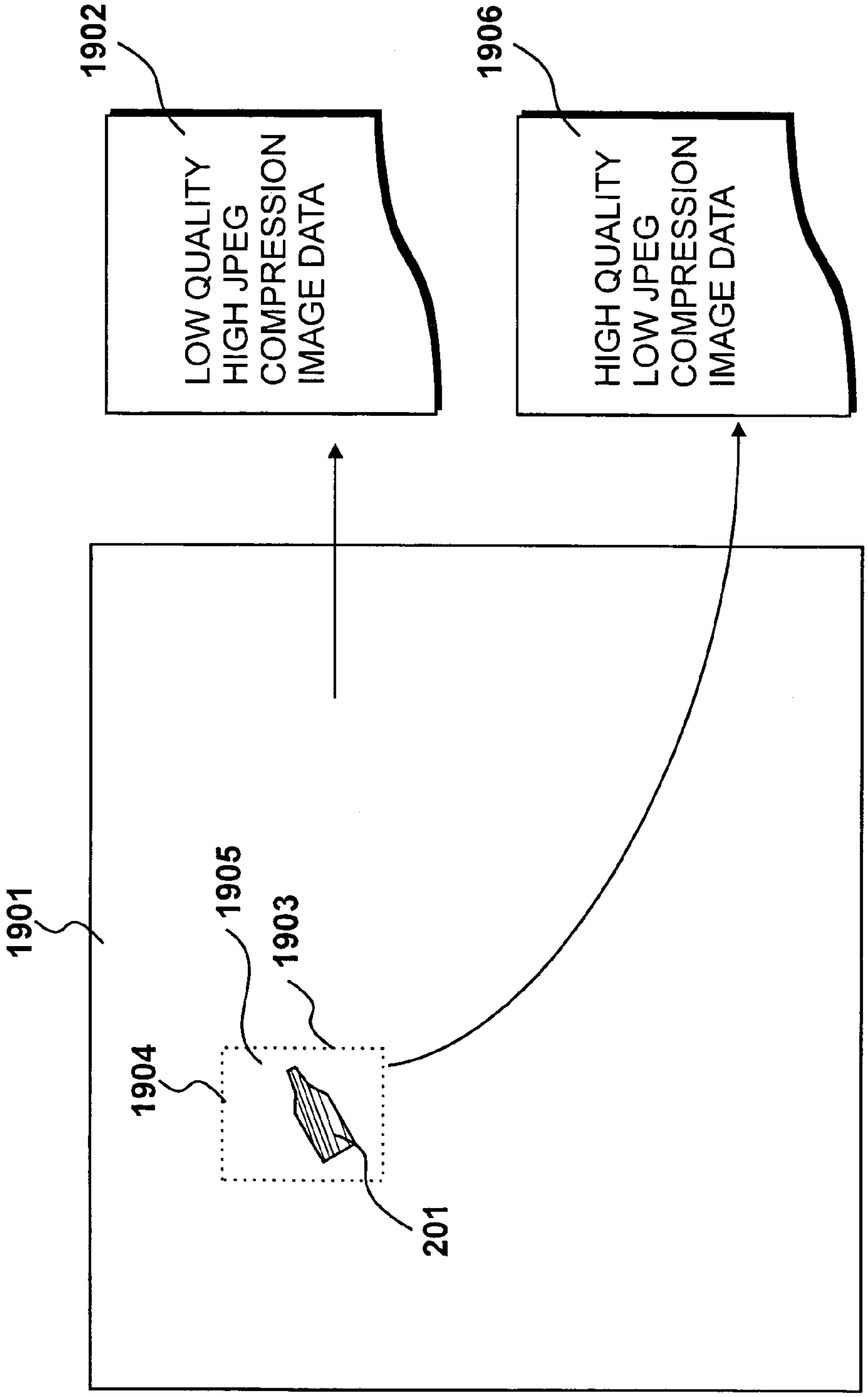
FIG. 19 shows an image frame in which an object has been detected.

An image frame 1901 is shown in FIG. 19 in which an object has been detected and image data has been recorded.

An object has been detected due to the activities of the vandal as illustrated in FIG. 2. Following step 1802 low quality high compression image data (such as JPEG) for the whole frame is generated, shown schematically as 1902. At step 1804 a bounding rectangle 1903 has been placed around object 201 and at step 1805 background pixels in the rectangle 1904 are replaced with zero value pixels. Thereafter, at step 1806 a high quality image is created for all pixels within the rectangle 1903 (including those that have been set to zero) resulting in image data 1905 of the bottle being recorded at high quality as illustrated by high quality low compression image data 1906.

It can be appreciated from the illustration shown in FIG. 19 that the bounding rectangle 1903 represents a relatively small portion of the overall frame 1901. Consequently, it is possible for the image frame to be stored and remotely viewed, by being retrieved from the data store, without using unnecessary bandwidth.

FIG. 20

Figure 20:
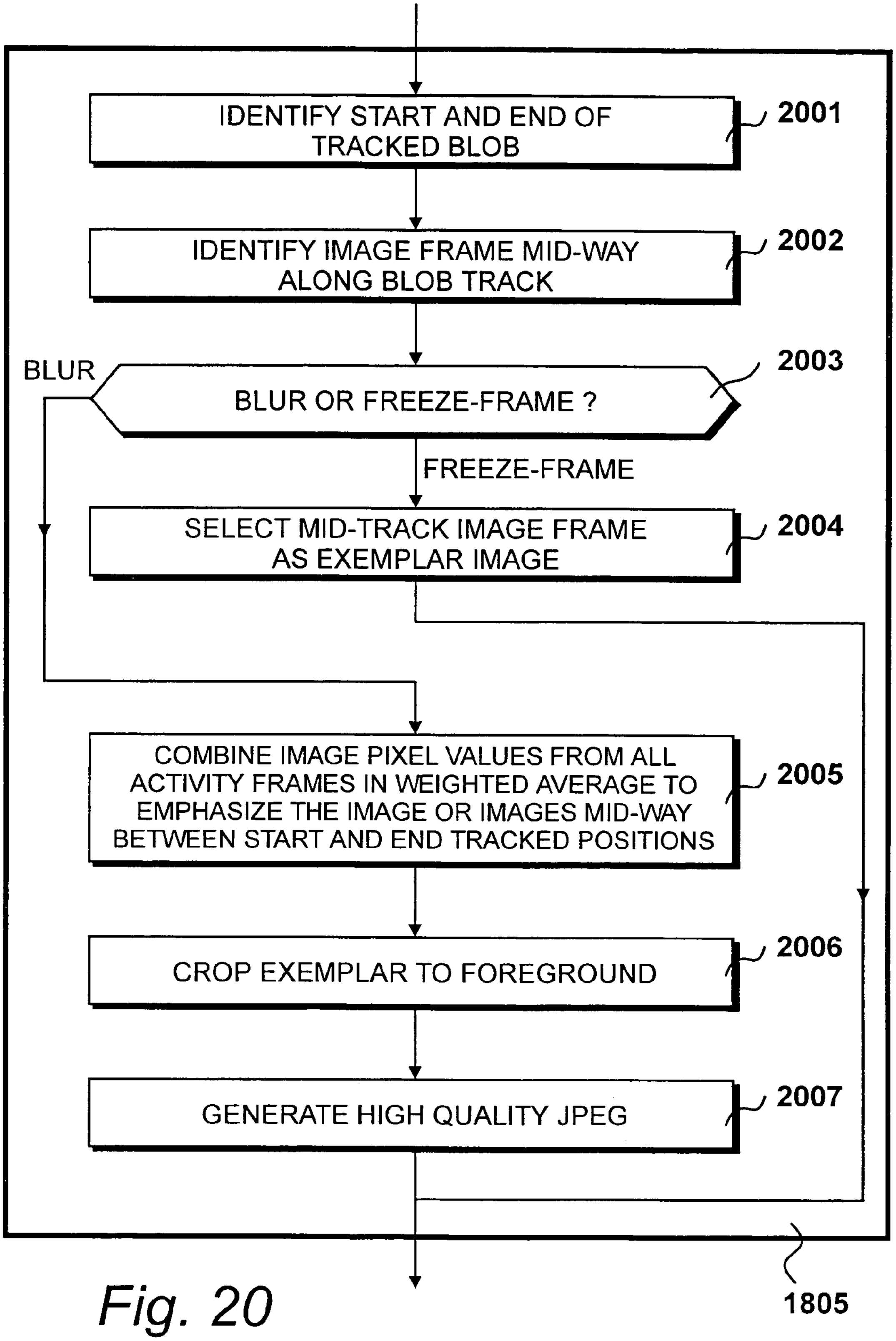
FIG. 20 details a process for the generation of an exemplar image as illustrated in FIG. 18.

Process 1805 for the generation of an exemplar image is detailed in FIG. 20. At step 2001 the start and end of a tracked binary large object is identified. Thus, this represents a frame where the tracking process started and a frame where the tracking process ended, both of which may be considered as points in time.

At step 2002 the block or clip of frames recorded throughout the tracking process is considered. From this collection of frames, an image frame substantially half way along the collection is identified.

In this embodiment, it is possible to select a single frame (a freeze frame) or to blur a plurality of selected frames to obtain an exemplar image, although other imaging techniques could also be used to achieve the desired image effect. Consequently, at step 2003 a question is asked as to whether a blur or a freeze frame operation is to be selected. If freeze frame is selected the mid-track image frame is selected as the exemplar image at step 2004.

Alternatively, if blur is selected at step 2003 image pixels from a plurality of images are combined, possibly with a weighted average so as to emphasis the image or images that are substantially mid-way between the start and the end of the tracked positions, at step 2005.

At step 2006 the exemplar image frame is cropped so as to remove background pixels such that a rectangular box containing the foreground remains. Thereafter, at step 2007 a high quality compressed image (such as JPEG) is generated and stored as the exemplar image.

When a blurring operation is performed at step 2005 image pixels may be combined from all of the activity frames in a weighted average so as to emphasise the image or images mid-way between the start and end of the track positions. Other methods are possible for selecting an exemplar or the kernel image in the case of a blurring process for the generation of the exemplar. For example, it would be possible to find the single frame that has the most difference between the frames just before and just after the activity sequence.

When detecting activities of potential interest, a likely scenario is for a person or object to move past a digital monitoring camera such that, at the start of the period of activity only part of the body or object is in view. Similarly, at the end of the activity a similar position may exist to the effect that only part of the body or object is visible, in this example, to the camera. Subsequently, it is around the middle of the activity that the person or object will tend to be fully in shot and this is why the exemplar image is selected as described above. Experimentation has shown that many activities of interest exhibit a similar recordal signature, such as passing cars, criminal activities and disturbances of many types.

FIG. 21

The procedures described with respect to FIG. 20 allow a single image to be recorded during what should be the most important part of an activity. Thus, this results in a single snapshot frame that is an exemplar of the activity as a whole and may therefore be referred to as an activity snapshot.

Figure 21:
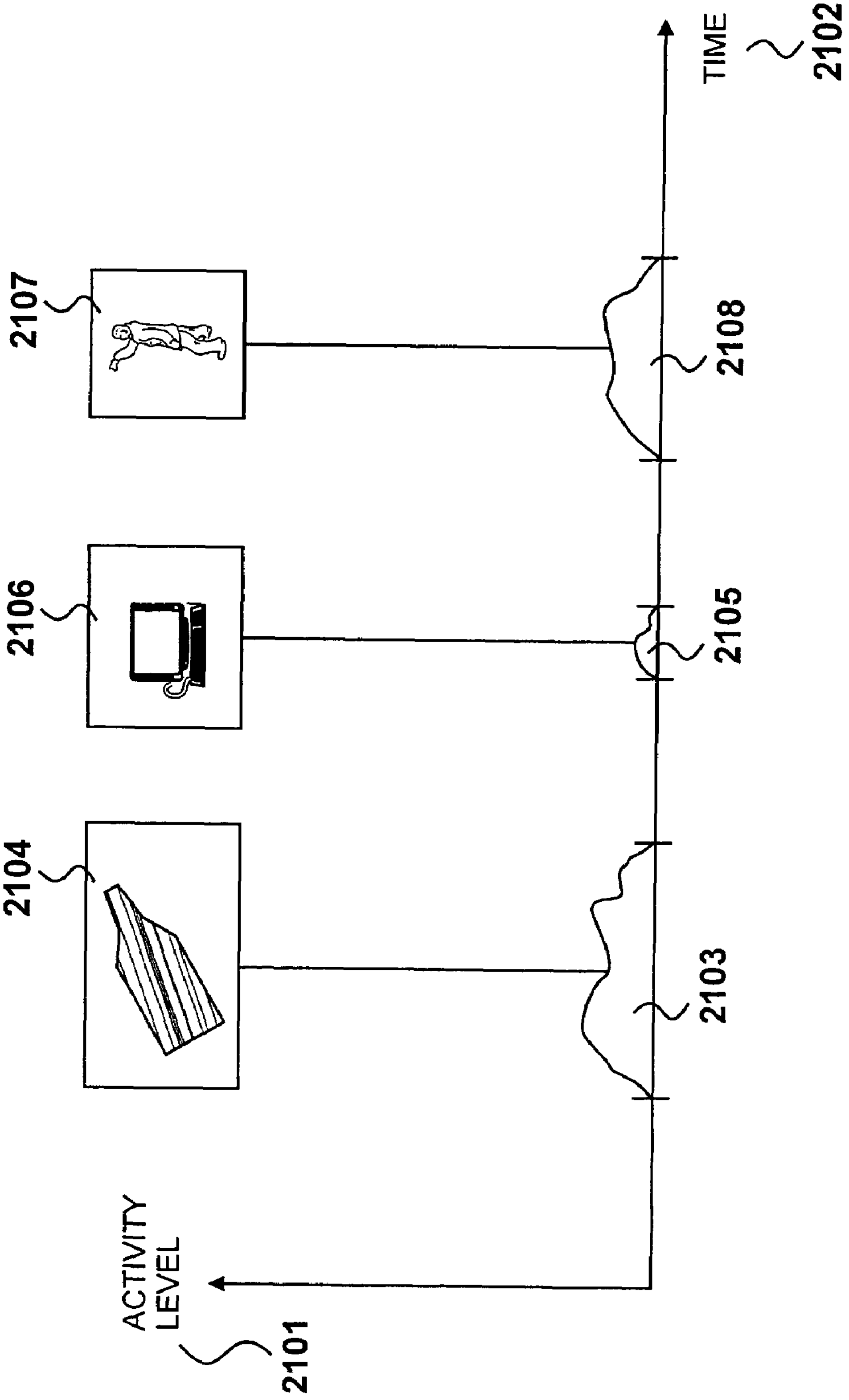
FIG. 21 shows a graph of activity level.

A graph is shown in FIG. 21 in which activity level 2101 is plotted against time 2102 for a plurality of cameras. A first camera has a period of activity 2103 resulting in a snapshot 2104 being recorded. Similarly, a second camera has a period of activity 2105 resulting in a snapshot 2106 being recorded. Finally, a snapshot 2107 is recorded in response to a period of activity identified from a period of activity 2108 in response to signals processed from a third camera.

Selected (freeze frame) images or generated (blurred) images are established by different analysers at different times. Exemplar images can be shown without their surrounding low quality images because it is the foreground area that is of most interest. In this embodiment, the full frame will have been recorded and the exemplar images are primarily intended for the identification and categorisation of stored image frames. Furthermore, when presenting exemplar images on a timeline, such as that presented on monitor 431, space may be limited therefore it can be configured such that only the foreground regions are displayed, and these can be scaled so as to be presented with a fixed height in the available space for the presentation of the timeline. Consequently, with height values being adjusted so as to fit the available space, it is possible for the images to have varying widths.

FIG. 22

As previously described, it is possible for a region of interest within a recorded frame to be stored at a higher spatial definition (with less compression) than the remaining background where very little of interest is occurring. It is therefore quite apparent that the background region is of little interest compared with the foreground area where the activity is occurring.

Conventional video recording cameras are known that include circuitry for enhancing the quality of images produced by the camera. In general, the camera will have automatic brightness and contrast controls so as to ensure that appropriate levels have been selected so as to give the best quality of picture overall. However, in accordance with the present embodiment, it has been appreciated that the camera controls can be adjusted in order to enhance the quality of regions of interest, such as region 1904, possibly at the expense of the background region. Consequently, in this embodiment, the digital monitoring cameras do not include circuitry for making these modifications locally. In this embodiment the input data signal is analysed to identify potential events of interest. Furthermore, upon detecting a potential event of interest, an output control signal is generated so as to modify a characteristic of the input data signal.

In this embodiment, the digital monitoring cameras, such as camera 304 are physically connected to the processing environment via a network connection. However, logically, this network connection facilitates communication both of output video signals and of input control signals.

Figure 22:
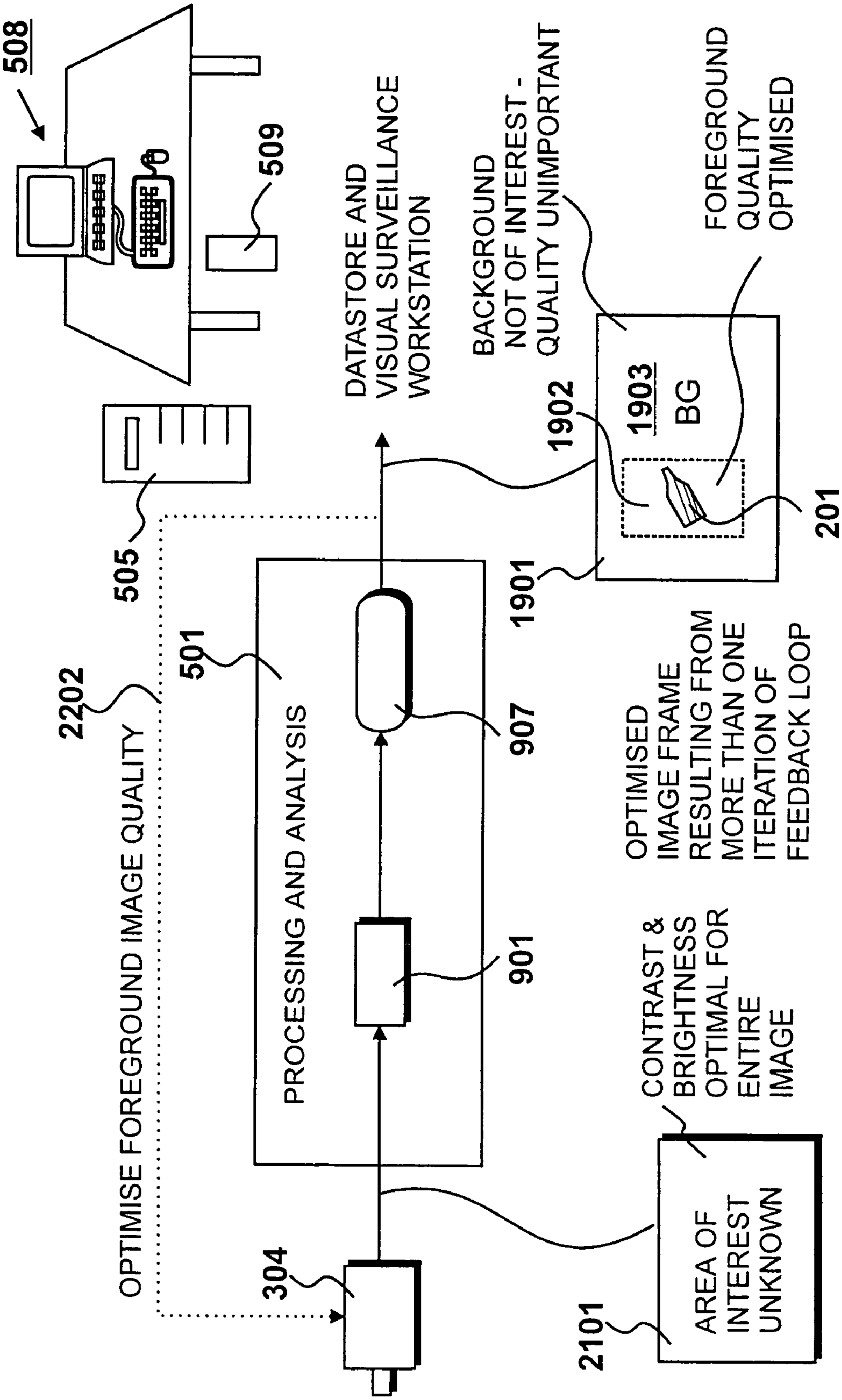
FIG. 22 illustrates adjustments to a monitoring camera.

Referring to FIG. 22, the camera 304 will initially view an area in a condition where it is unknown as to whether an area of interest exists. Consequently, as illustrated by 2101 contrast and brightness settings for the camera are adjusted so as to provide an output video signal that is optimal for the entire image.

As previously described, the output video signal from camera 304 is processed by capture object 901 and analyser object 907 such that the analysis and activities result in the determination being made as to whether a potential area of interest exists. If such an area is identified, it is possible to provide a feedback signal 2202 to the camera 304 so as to optimise the contrast and brightness levels not for the image as a whole but for the particular area that has been identified as being of potential interest.

Considering the techniques that have previously been described, it can be appreciated that having optimised the response of camera 304, the subsequent processing techniques will provide further enhancement of the area of potential interest such that of foreground area 1902 is recorded at optimised quality to the expense of a background area 1903. In this way, optimised images are recorded on the data store 505 and are made available to the observing workstation 508.

FIG. 23

Figure 23:
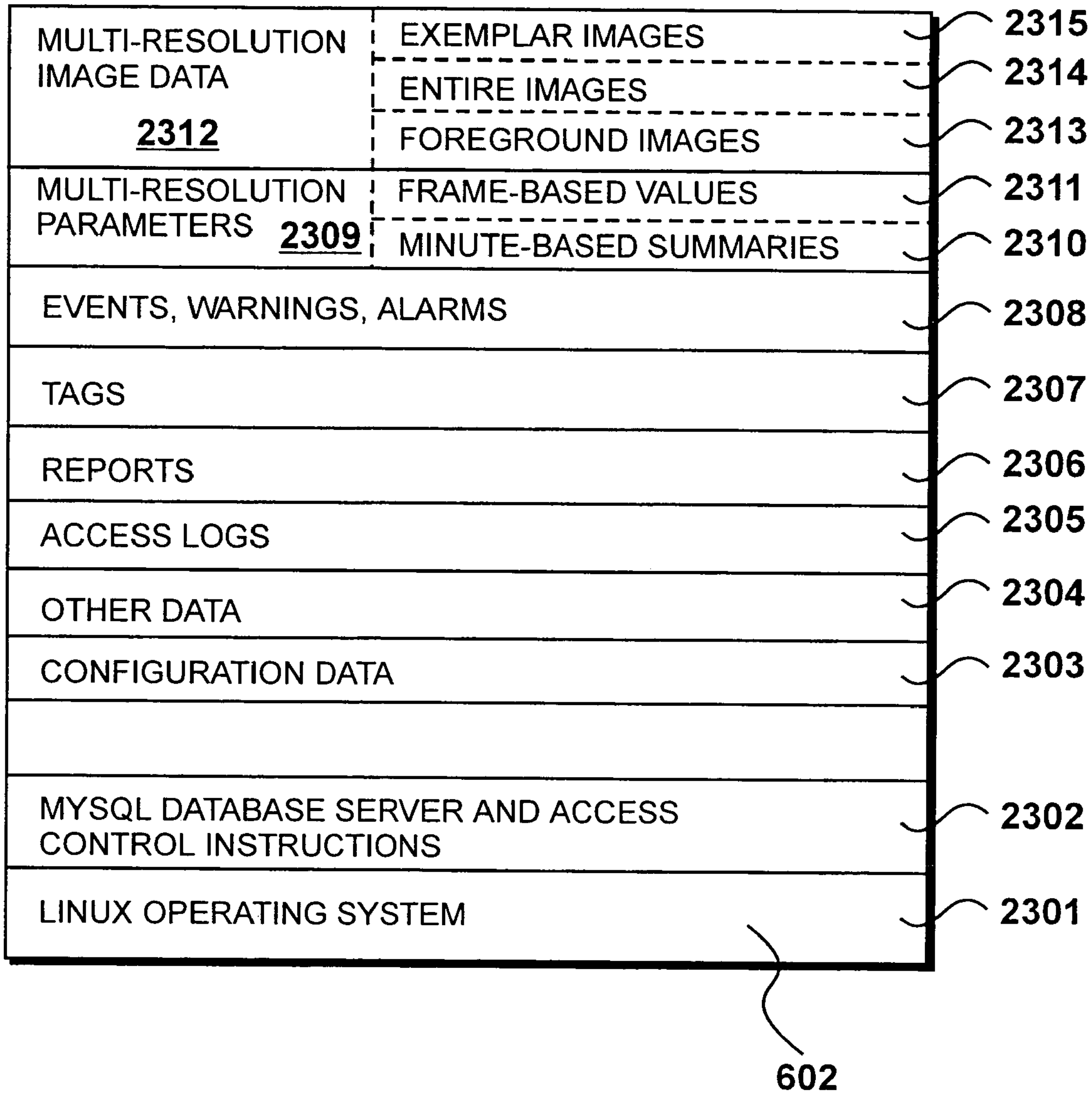
FIG. 23 illustrates data storage.

At the data source 505 the hard disk drive 603 takes the form of a redundant array of independent disks 602, as shown in FIG. 23. Many different types of data are stored on this data store originating from many different sources within the system. A Linux® operating system 2301 is stored in combination with instructions for a MySQL database server thereby providing the main functionality of the data store system. The data store object 917 shown in FIG. 9 exists as a result of executing the MySQL instructions 2302 in combination with configuration data 2303. Other data includes various configuration and dynamic data that are stored on the array 602 by the instructions derived from 2301 and 2302.

Access logs 2305 are generated as a result of operator access to any kind of data, whether live or recorded, so that privacy levels can be monitored and personnel activities checked.

Reports 2306, tags 2307, events, warnings and alarms 2308 are generated in response to system operation. These collectively represent time-based data records describing the status of the camera sensors or the system as a whole at particular points in time.

Within the data store, sufficient storage is provided to enable the output from multiple cameras to be recorded over several months; particularly given that only significant activity is recorded. Furthermore, when significant activity is recorded only the foreground parts of each image frame are recorded at high quality, in the present embodiment.

Multi-resolution parameters 2309 include frame-based values 2311 generated at step 1702 and minute-based values 3310 generated at step 1704. The multi-resolution images themselves include foreground images 2313, entire images (at low quality) 2314 and exemplar images 2315.

FIG. 24

Figure 24:
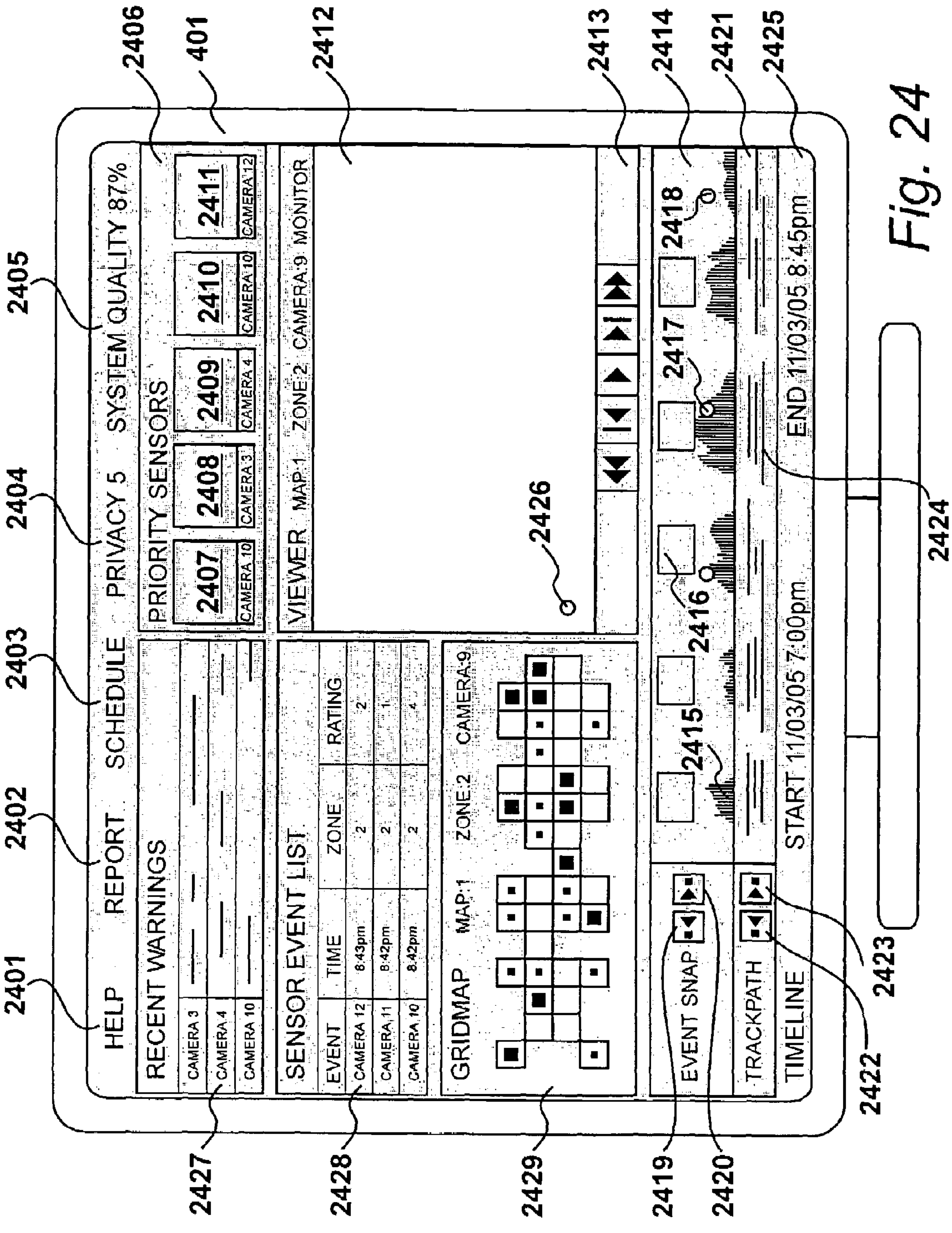
FIG. 24 shows a graphical user interface as displayed on a monitor of the type shown in FIG. 4.

During monitoring operations, information is presented to the operator in the form of a graphical user interface displayed on monitor 401. A typical example of such an interface is illustrated in FIG. 24 although it should be appreciated that, as previously discussed, the actual layout of this interface may be modified to some extent in accordance with user preferences. It should be appreciated that this represents an example of a possible graphical user interface and many alternative arrangements will be possible while providing substantially similar functionality.

A menu bar is presented at the top of the interface and in the present embodiment includes menu items "help" 2401, "report" 2402, "schedule" 2403 and "privacy" 2404. To the right of the top of the screen there is also a display region 3405 that displays the measure of system quality. This represents general operational quality of the monitoring system derived primarily from an accumulation of camera health values and possibly incorporating measures of any other devices that suffer degradation and require servicing.

The help menu 2401 opens a help system to guide the operator in an interactive way.

Report menu 2402 is used to generate one of several types of report or to configure the system to generate report automatically. Thus, in this way, it is possible to generate a daily report both in paper form and for distribution in electronic form, possibly as a HTML document.

Schedule menu 2403 is used to select operations associated with a generation of a maintenance schedule. Thus, enquiries may be made as to whether it would be appropriate to schedule maintenance or estimates may be provided as to when a maintenance operation would be appropriate. Furthermore, it is possible for maintenance schedules to be printed and there after acted upon by maintenance operatives.

Similarly, the privacy menu 2403 is used to select a privacy level from 1 to 6.

The priority sensors area 2406 includes (in this example) five small image display areas 2407, 2408, 2409, 2410 and 2411. An output from any of the digital monitoring cameras may be directed towards any of the small image display areas and in each image display area 2407 to 2411 a reference is included at its lower portion identifying the source from which the images are taken. A scroll bar may be included to facilitate a selection of particular outputs for the small image display areas. It is usually intended that the selected images should be derived from camera outputs that are considered to be of interest, either selected by the operator themselves or by processing procedures (possibly forms of artificial intelligence) included within the monitoring system itself. During operation, images captured in real time are supplied to the allocated small image display areas.

A situation may arise in which there are more camera outputs that are considered to be of interest than there are small image areas available for these priority outputs to be displayed. Under these circumstances, it is possible to cycle through all of the outputs of interest (at a selected speed) so that they may be periodically reviewed in the priority sensors area 2406. Furthermore, it is possible for procedures to be included than give weightings to the priority levels such that outputs considered to be of most interest are shown to a greater extent within area 2406 compared to outputs that are considered to be of less interest. Thus, for example, cameras that have captured high degrees of activity (as determined by a respective analyser) may be considered as being of most interest and are therefore given more prominence in the displayed interface.

A main viewer 2412 allows a single large image to be displayed, usually by coming from the camera considered to produce outputs of the highest priority or from the camera where the most recent event likely to be of interest has been detected through the monitoring process. This represents a first default mode operation in which images are being acquired directly as they are being captured. In a second mode of operation the main viewer presents the most recent events and only updates the display when a new event is added or detected.

In a third mode of operation it is possible to review previously recorded images and control of the display is achieved using conventional video navigation controls 2413. Consequently, the navigation controls 2413 allow the video images that have been stored to be played forward and backward at any speed, were also allowing the user to select and go to a next or previous event. Furthermore, as an alternative to using control 2413, navigation of stored video may also be achieved by using gestural movements of a user-input device, such as mouse 403. Thus, in this way, forward play may be instructed by clicking and dragging to the right and backward play may be selected by clicking and dragging to the left. Replay speed may be adjusted by performing similar actions but by dragging repeatedly in the same direction. For example, if the current speed is 4 times normal play speed, dragging to the left may make it 3 times the current speed where dragging to the right may make it 5 times normal speed. Furthermore, a tapping action may allow a jogging operation to be affected, either 1 frame forwards or 1 frame backwards.

Facilities are also included for cropping and zooming so as to select specific regions while reducing the amount of data that is transported over the network 504.

A first timeline 2414 displays an activity graph 2415, of the type described with reference to FIG. 20.

Furthermore, in addition to elements 2415 showing analysed activity, the timeline 2414 also includes exemplar images 2416 and tag markers 2417 and 2418.

An event snap control allows the user to navigate timeline 2414 by operation of a first button 2419 or a second button 2420. Operation of button 2419 enables the user to navigate to a previous exemplar image while operation of button 2420 allows the user to navigate to the next exemplar image; these possibly being derived from a number of different monitoring cameras.

A second timeline 2421 displays tracking information from several monitoring cameras. Track path control buttons 2422 and 2423 provide for navigation in a backward direction (2422) and in a forward direction (2423). The track path includes a plurality of substantially horizontal lines 2424 each representing an object that has been tracked over the duration represented by the length of the line. In this embodiment, it is possible to provide further encoding to the nature of the line. Thus, on detecting certain conditions, a line 2424 may be displayed as a thicker line compared to lines for which this condition has not been detected.

Alternative representation may also be included, such as colour coding. In this embodiment, different colours are selected to represent other attributes of the tracking process, such as the velocity of the object being tracked. Thus, for example, relatively slow objects may be colour coded blue with relatively fast objects being colour coded red. Depending on the particular monitoring application, slow movement or fast movement may be considered as unusual and therefore may represent an event likely to be of interest.

A timeline navigation bar 2425 enables a user to define start and end times for the timeline and it is possible for a duration specified in this way to vary from, say, minutes to years etc. In this way, it is possible to identify an event if it is known that the event occurred within a particular period. Thus, for example, it may be known that an event occurred in a particular year or in a particular month. Having selected this duration, events are displayed in the first timeline 2414, which assists in terms of identifying the specific event of interest. In this way, the system is made more useful given that it should be possible to identify events of interest relatively rapidly without, for example, spooling through many hours of recorded video tape.

Main viewer area 2312 includes a tag icon 2426. Selection of this icon (by means of a mouse click for example) provides a record to the effect that a particular image has been tagged. Furthermore, the tag may also include information, including information generated automatically (such as an indication of an event likely to be of interest or an alarm condition) and may also include text manually entered by the operator, or via keyboard 402.

A recent warnings area 2427 provides a summary of recent warnings that have been generated. These will generally include alarm events and events of a serious nature that require immediate action to be taken. Similarly, a sensor events area 2428 provides a summary of events that have been detected by the monitoring system and are considered to be likely to be of interest.

The interface also includes a grid map area 2429. The grid map 2429 provides an interface for viewing the status of monitoring cameras and other sensors connected to the system. It allows cameras to be grouped such that each group is shown in a grid lay out.

A configuration mode enables cameras to be assigned to a topological or logical group. Initially, the grid has all cells available and is therefore represented as a complete grid. The grid map may be used to create layouts by clicking on cells or dragging over a range of cells to either deselect them and turn them off or to map cameras to the cell, thereby creating a layout or map of a group of cameras.

When cameras are placed in a topological or logical group, they are considered to be mapped, where as unmapped cameras are shown below the selected map, being those that have not been assigned to a group. The mapped cameras are each illustrated positioned relative to the positions of other cameras in the group, by means of a square cell. An example of a topological grouping is "level 1, zone 2", which would be all of the cameras on the first floor in one section of a monitored environment.

Logical groupings are also possible thus, for example, a map may display a logical grouping of exits, this being the group of all of the cameras (and possibly other sensors) that are in a position to record information about the exits of an environment.

In monitoring mode, the digital monitoring cameras may be selected within the map using an input device such as mouse 403. In this embodiment, a selected sensor is displayed using a different colour all bar means of an alternative graphical representation (possibly where colour is not available).

The grid map may also include a camera list for sensor selection, thereby allowing the quick designation of the grouping being displayed and the camera output selected. The main viewer 2426 can be configured to display video images of a selected (in focus) camera output. The degree to which images and/or data can be displayed in regions 2312 and 2307 to 2311 depends upon the privacy access level 2304.

The state of cameras in the group may be quickly assessed from the grid map interface given that a white square within a sensor cell indicates activity based on the measurements determined by a respective analyser. Thus, for a high level of activity a large white square is displayed within the cell for the sensor. Similarly, when a significant event or an alarm condition occurs it is possible for its associate cell to flash red and white. In the configuration, a cell may or may not have a camera output associated thereto and this condition is displayed by representing the cell using a brighter colour than a camera output has been allocated.

FIG. 25

Figure 25:
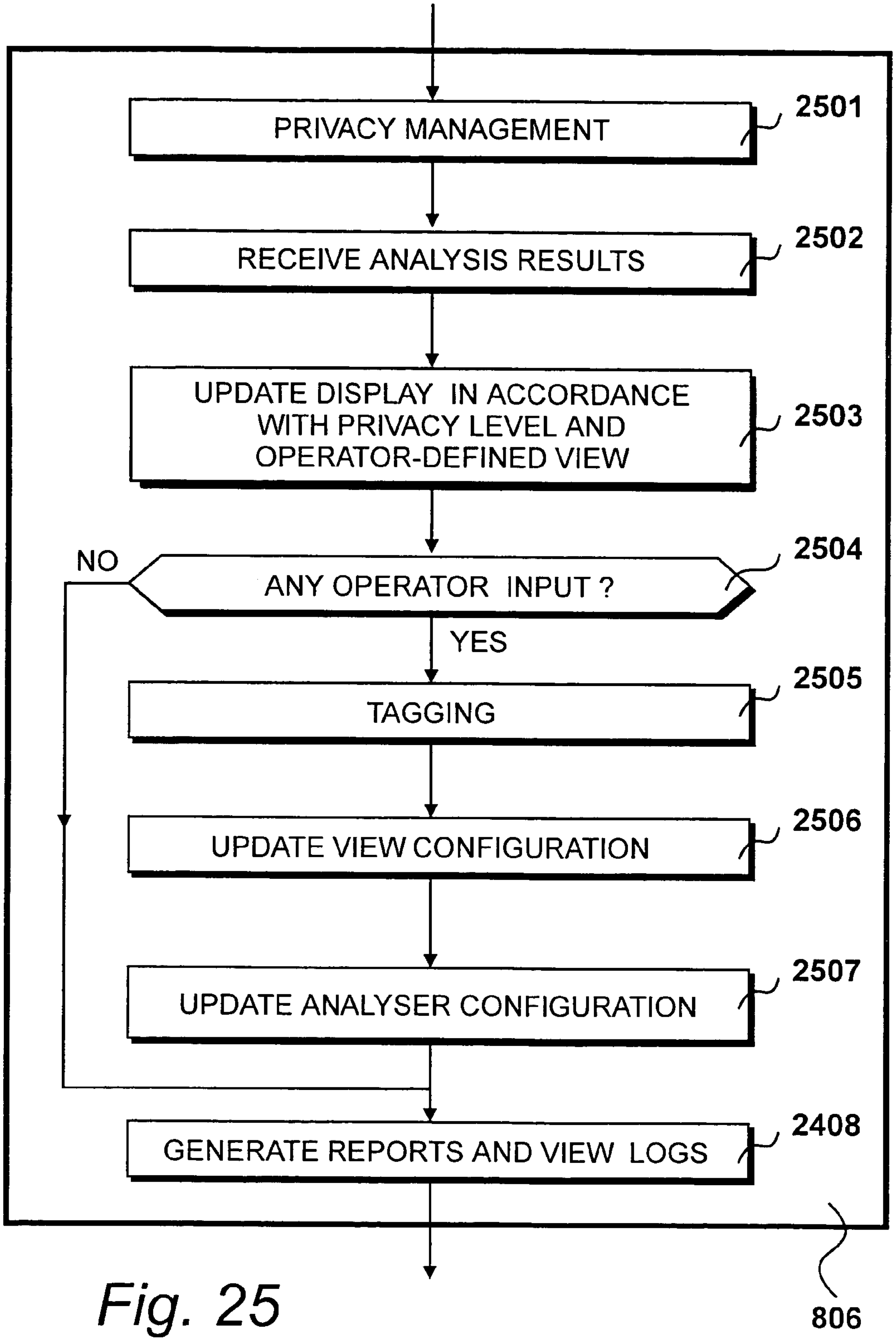
FIG. 25 shows operations performed by a monitor workstation.

The actions of monitor workstation instructions 806 are detailed in FIG. 25. At step 2501, a level of privacy is selected (as detailed in FIG. 26), and control is taken over access to images and data resulting from analysis. Analysis results are received at step 2502, possibly including image data from connected analysers (depending on the decision taken at step 1004 in FIG. 10).

At step 2503 the display is updated in accordance with the level of privacy defined. At step 2504, if no operator input is received then control is directed to step 2508. If operator input is received (for example from keyboard 402 or mouse 403) then tagging takes place at step 2505. This occurs if the user has selected the tag icon 2426, for example by means of a mouse click. In this embodiment, if a single click is received, then a tag is created for that time and the camera currently in the main viewer 2412. If a double click is received, then an operator is invited to input some descriptive text relating to the tag. Tag data is then stored in datastore 2307.

At step 2506, the view configuration is updated, including modification to variables and parameters, such as zoom parameters, in response to operator input.

Some operator actions will result in the need to update the configuration of one or more of the analysers 907 to 912. For example, when changing which camera analyser output to view in the viewer 2412 or priority sensor display areas 2407 to 2411. This takes place at step 2507.

At step 2508, reports and access logs are generated if requested by the operator, or if the system is configured to automatically produce reports or logs with a predetermined level of regularity, for example daily.

In this embodiment, access logs are text files describing each type of viewing operation performed within a given time period, and are non-erasable and non-modifiable by the operator. They are available to view if the operator has an appropriate level of privacy access.

FIG. 26

Figure 26:
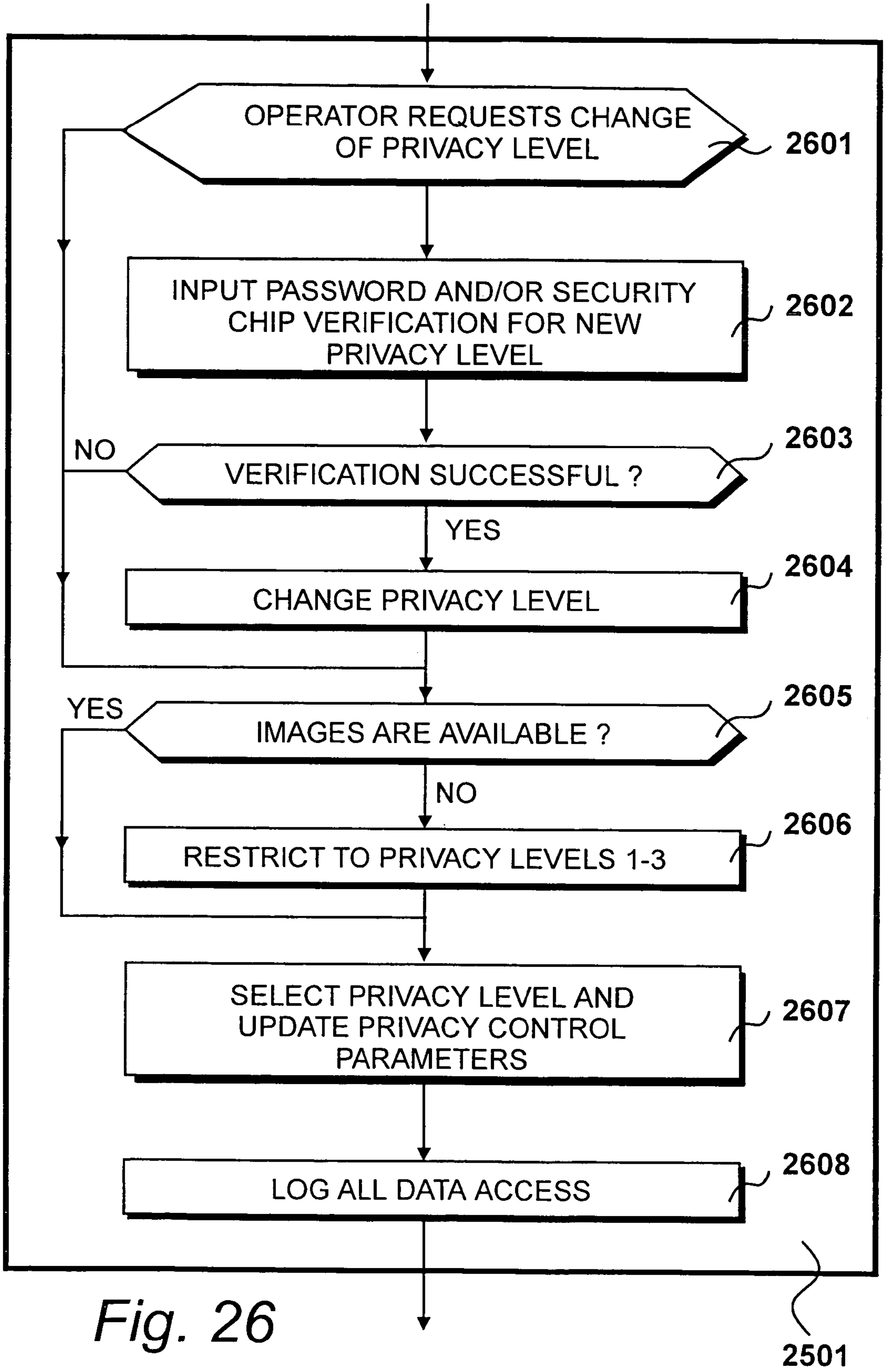
FIG. 26 details a process for allowing privacy selection, as shown in FIG. 25.

Step 2501 in FIG. 25 is detailed in FIG. 26. At step 2601 a question is asked as to whether the operator requests a change of privacy level. If this question is answered in the negative, then control is directed to step 2605. However, if the question is answered in the affirmative, verification of the operator's authority to access a higher privacy level is required at step 2602. This verification could be in the form of a username, password, security chip 404, fingerprint detection, iris detection, or any combination of these.

At step 2603, if verification is not successful, then control is directed to step 2605. If verification is successful, then the privacy level is changed at step 2604.

At step 2605, a question is asked as to whether images are available, i.e. whether or not images are being stored, which was decided at step 1004 in FIG. 10. If the images are being stored then this question will be answered in the affirmative, and control will pass to step 2607. If the question asked at step 2605 is answered in the negative, then access is restricted to privacy levels 1 to 3, detailed further in FIG. 27.

At step 2607, the chosen privacy level is selected and various privacy control parameters are updated. These parameters include controls of the display as shown in FIG. 24, depending upon the level of privacy.

At step 2508, all data access is logged. A text file or similar data log is created including, for example, the timestamp of the data accessed, when it was accessed, and who accessed it. Logging occurs regardless of whether a restricted or non-restricted operator accessed the data, and it cannot be prevented.

Secure processing environments such as those provided by Linux® facilitate a high degree of protection against unauthorised interference and/or data access. This means the logs created can be secure from tampering, as an extremely high level of technical skill and access to design documentation would be required in order for anyone to amend the files.

FIG. 27

Figure 27:
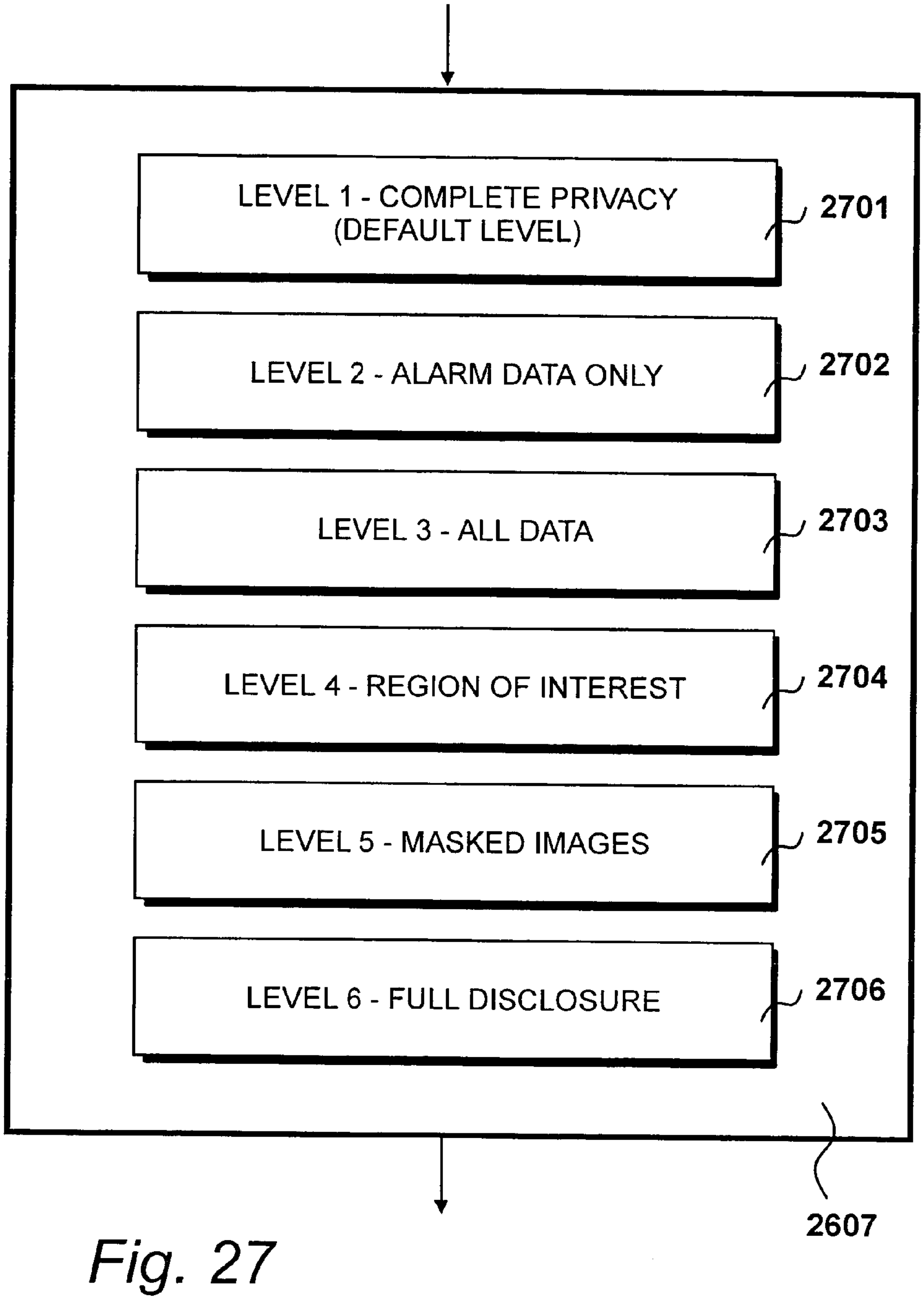
FIG. 27 details privacy level configuration.

In this embodiment, levels of privacy would be configured at step 2607 in FIG. 26 in accordance with FIG. 27.

Level 1 privacy settings are detailed at 2701. Level 1 is the default setting and provides complete privacy, with no images or image data displayed. The operator is informed that the system is functioning correctly, and timestamps for images can be viewed.

Level 2 privacy is described at 2702. At level 2 alarm data is shown. If an alarm is generated, then high level information relating to the alarm can be viewed, for example a tracking path. No images are visible at this level.

Figure 32:
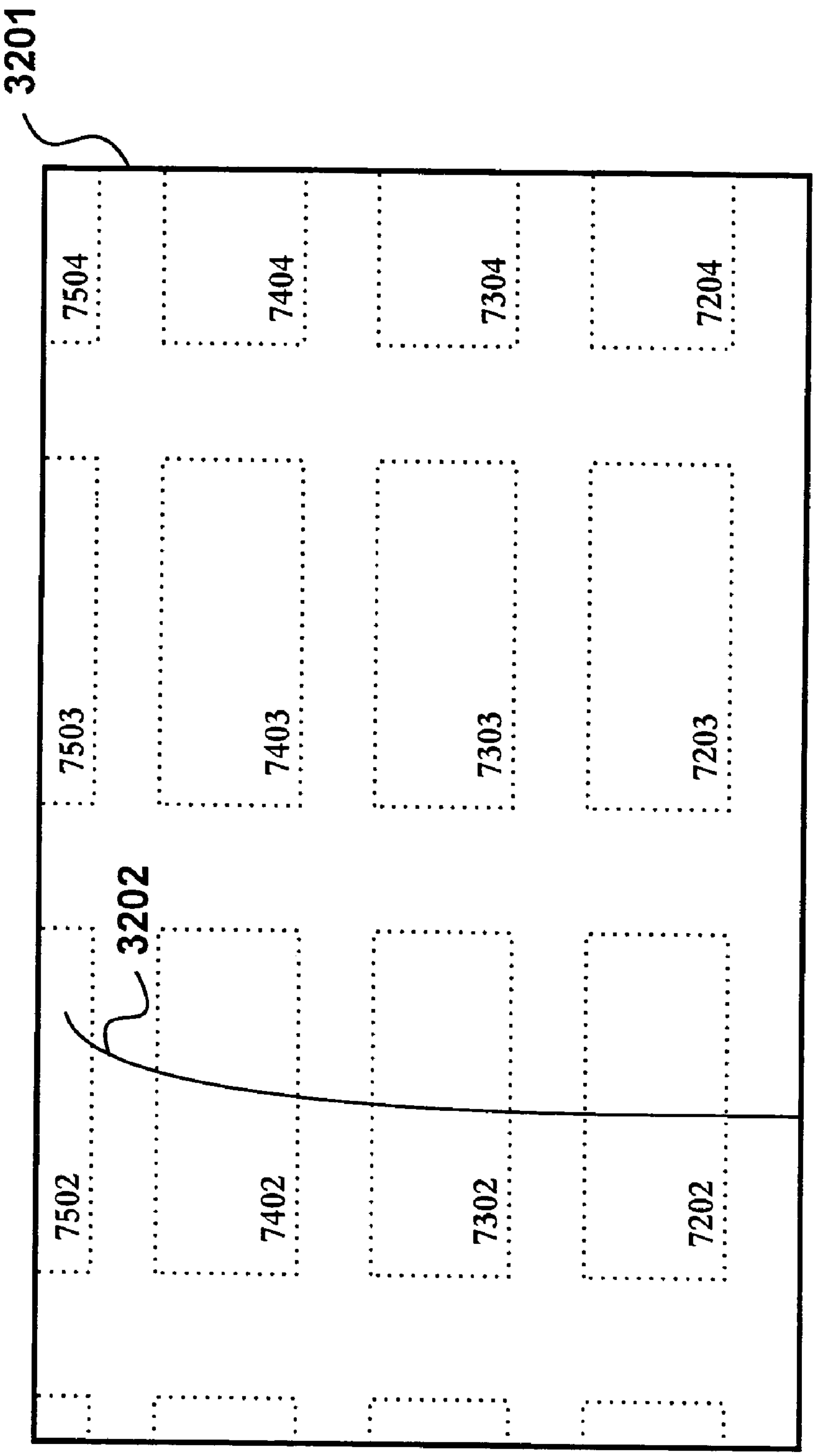
FIG. 32 illustrates further privacy level selection.

Level 3 privacy is shown at 2703. At level 3 all image data is provided but no images are displayed. This means that all object tracking information, activity levels, etc are viewable, but no images are displayed. This is illustrated in FIG. 32.

Figure 30:
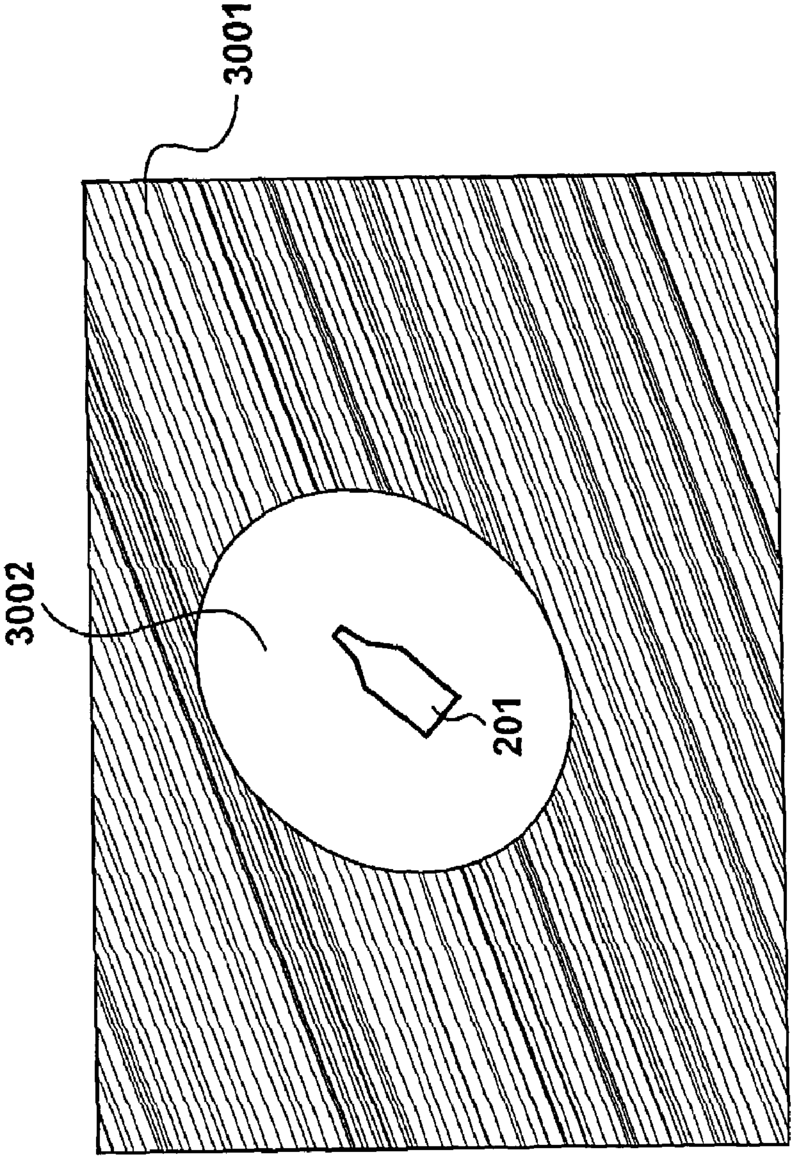
FIG. 30 shows a selected privacy mask.

Level 4 privacy is described at 2704. At level 4 the information available at level 3 is shown, with the addition of image data for the region of interest which corresponds to an event only. This is illustrated in FIG. 30.

Level 5 privacy is described at 2705. At level 5 images are shown with a mask in place to protect privacy. The mask is composited on top of images to avoid certain portions being viewed.

Level 6 represents full disclosure. At this level all images and image data are available.

FIG. 28

Figure 28:
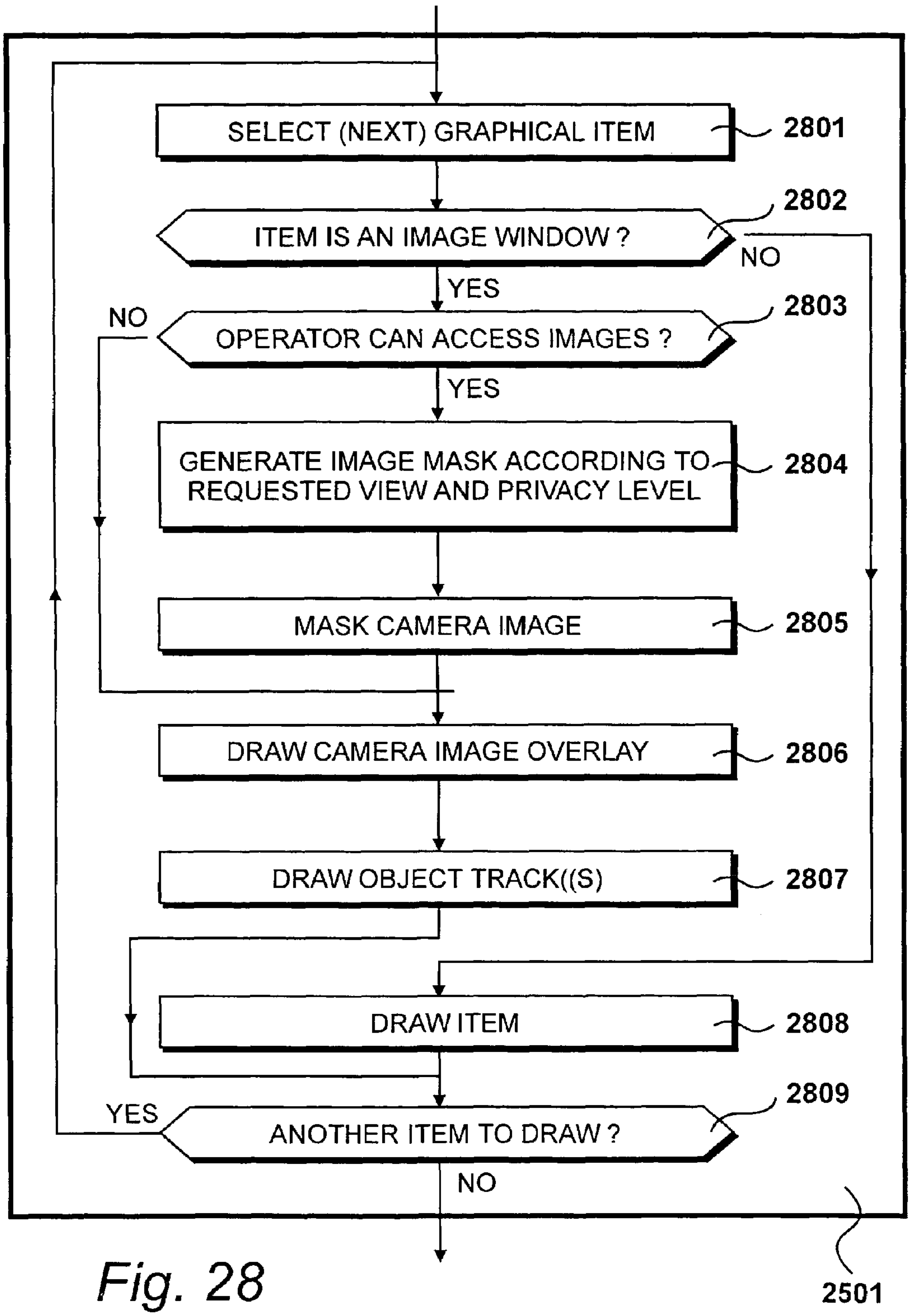
FIG. 28 details procedures for updating a display.

Procedures 2503 for updating the display in accordance with the level of privacy defined are detailed in FIG. 28. In this embodiment, a graphical user interface is double-buffered and a hierarchical list of items is created which is then drawn each time the screen is refreshed. After drawing all of the items that require to be updated, the front and back buffers are swapped.

At step 2801 the first graphical item is selected and at step 2802 a question is asked as to whether the item is an image window. If this question is answered in the affirmative, a question is asked at step 2805 as to whether the operator can access the images.

In response to the question asked at step 2803 being answered in the affirmative, an image mask is generated according to the requested view and privacy level. Thereafter, at step 2805 the camera image mask is applied.

At step 2806 a camera image overlay is drawn and at step 2807 object tracks are drawn. Thus a representation of the movement of a tracked object is superimposed upon a representation of the monitored environment. Thereafter, at step 2809 a question is asked as to whether another item is to be drawn and when answered in the affirmative control is returned to step 2801 whereupon the next graphical item is selected.

If the question asked at step 2802 is answered in the negative an item is drawn at step 2808 with control then being directed to step 2809 for the question to be asked as to whether another item is to be drawn. If the question asked at step 2803 is answered in the negative, steps 2804 and 2805 are bypassed.

The image area to be drawn has various characteristics such as size, location etc. Privacy levels 4 to 6 specify different ways in which the image can be drawn which, except for privacy level 6, involves the drawing of a mask. Thus the representation of the monitored environment can, in this embodiment, be unaltered image data of the environment for level 6, wholly or partially masked image data of the environment for levels 4 and 5, and a diagram of the environment, provided by a vector image, for level 3. In other embodiments it is envisaged that other representations of the environment could be used.

The drawing of an overlay is often desirable, particularly when no image data can be shown at all, as for the lower privacy levels. The camera image overlay (as distinct from an image mask) is a graphical vector image that shows, for example, apartment locations and apartment numbers superimposed upon the camera image or as an alternative to the camera image.

The drawing of object tracks at step 2807 is permitted in privacy levels 2 to 6 so the procedure is conditional upon being given access at one of these levels; no object tracks are drawn if at privacy level 1.

The object tracks combined with the image overlay drawn at step 2806 enable the security system to be useful even when no actual image data is being displayed or even stored.

FIG. 29

Figure 29:
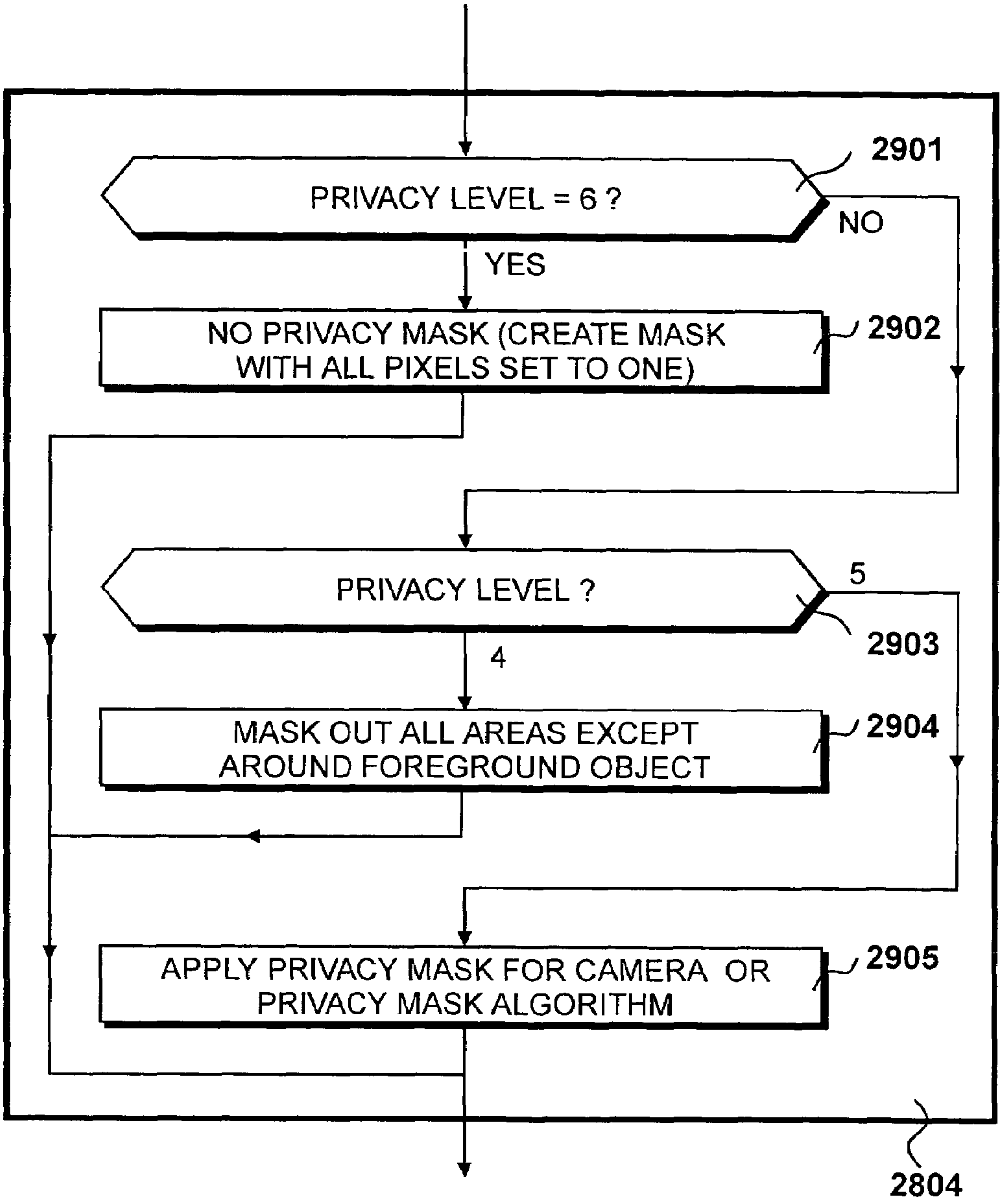
FIG. 29 details procedures for the generation of a privacy mask.

Step 2804, where the image mask is generated, as shown in FIG. 28, is detailed in FIG. 29. This procedure deals with privacy levels 4, 5 and 6.

At step 2901, a question is asked as to whether the privacy level is set to 6. If this question is answered in the negative, control is passed to step 2903. If the question is answered in the affirmative, the no privacy mask is created, implemented by creating a mask and setting all the pixels to 1.

At step 2903, the privacy level is questioned. If the privacy is set to level 5, control is directed to step 2905. Alternatively, if the privacy is set to level 4, then masking of all areas except the foreground object occurs at step 2904. This is further illustrated in FIG. 30.

Figure 31:
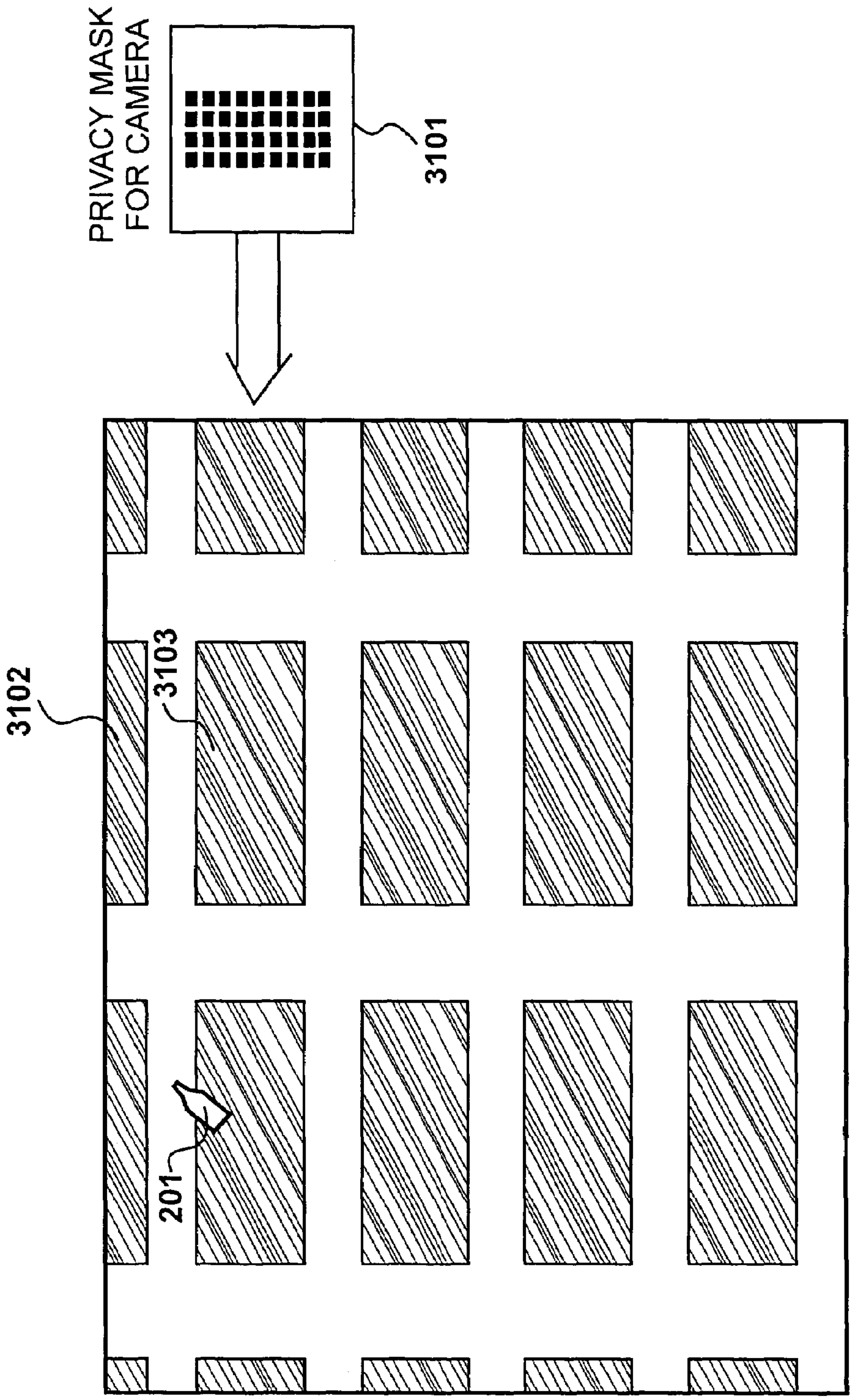
FIG. 31 shows privacy level selection.

At step 2905, a privacy mask or privacy mask algorithm is used for the camera. In the case of the apartment block, the privacy mask would provide an image which would have the windows blacked out, as shown in FIG. 31. A privacy mask algorithm could, for example, detect all instances of a given object in a scene, and apply a mask to them. It could therefore, for example, be used to block out faces a scene.

FIG. 30

The privacy mask for level 4, as selected at step 2904 of FIG. 29, is shown in FIG. 30. An image frame 3001 is masked so that the only part of the image visible is the immediate proximity to the foreground object 201.

In this embodiment, the edge of the mask is smoothed and allows viewing of an area 3002 slightly larger than the foreground image.

FIG. 31

Step 2905, shown in FIG. 29, where the privacy level selected is 5, is detailed in FIG. 31. An image mask 3101 is applied to an image frame 3102, resulting in masking of windows 3003. The foreground (in this case the image of the bottle 201) can superimposed upon this, or, depending upon the requirements in terms of privacy level access, the falling object itself could be masked by the image mask 3001.

FIG. 32

Privacy levels 2 and 3, as described with reference to FIG. 27, are illustrated in FIG. 32. Within image 3201 a representation of the environment is provided by camera image overlay 3202 (as described with reference to FIG. 28), wherein each apartment window is labelled with its apartment number. The path of falling object 201 can be superimposed or composited onto the image overlay, in alignment, so that information relating to where the object 201 was dropped from can be obtained simply from its tracking data. It can therefore be established that object 201 was thrown from apartment 7502, without any of the captured image itself (which may or may not have been recorded) being shown.

Thus image data depicting a monitored environment is captured and the image data is analysed to identify moving foreground objects. Upon identifying an object, the movement of the object is tracked; and graphical output data is generated providing a representation of the tracked movement superimposed upon a representation of the environment.

Having observed such an incident, either live or in a recording, monitoring personnel may apply for permission to observe additional details, for example to see the face of the person who threw the object. Depending upon the configuration of the system, and privacy regulations in the local territory of use, it may be the case that this information would be of use. However, it may equally be the case that this information would be unnecessary, and its absence would provide a desired level of privacy in many situations.

What I claim is:

1. A method of monitoring an environment, comprising the steps of capturing image data depicting said environment; and analyzing said image data to identify moving foreground objects; wherein upon identifying an object, the movement of said object is tracked; and graphical output data is generated providing a representation of said tracked movement superimposed in alignment upon a representation of said environment; wherein said representation of the environment is said captured image data with portions of said image data visible and other portions masked and varying portions of the visible image data are masked according to the level of access granted to the user.

2. A method according to claim 1, wherein a background model is created and events are identified by processing said captured image data with reference to said background model.

3. A method according to claim 2, wherein said representation of the environment is the background model.

4. A method according to claim 1, wherein a masked image is displayable to an observer in real time.

5. A method according to claim 1, wherein an operator is provided with access means for viewing a greater proportion of the captured image data upon identification of a moving foreground object.

6. A method according to claim 5, including logging means for maintaining a log when said access means has been used.

7. A method according to claim 1, wherein said level of access is authenticated by checking an identifying means for a user.

8. A method according to claim 7, wherein said identifying means takes the form of a biometric of the user.

9. A method according to claim 1, wherein said representation of the environment is a diagram of the environment.

10. A method according to claim 9, wherein the detection of an object being thrown from a predefined window area within said diagram of said environment is identified as a potential event of interest.

11. A method according to claim 1, wherein an attribute of said graphical output data adapts in response to a detected characteristic of said movement of said object.

12. A method according to claim 1, wherein said environment is a building and the mask is applied to window areas of said building.

13. A method according to claim 1 wherein said captured image data is stored.

14. A method according to claim 13, wherein the replaying of said stored captured image requires an access certificate to be obtained.

15. A method according to claim 1 wherein said graphical output data is stored.

16. A computer-readable medium having computer-readable instructions executable by a computer or by a network of computers such that when executing said instructions said computer(s) will perform a method as defined by claim 1.

* * * * *